(12) United States Patent
Roberts et al.

(10) Patent No.: US 11,927,522 B2
(45) Date of Patent: Mar. 12, 2024

(54) METHODS FOR IDENTIFYING SATURATED DATA SIGNALS IN CELL SORTING AND SYSTEMS FOR SAME

(71) Applicant: Becton, Dickinson and Company, Franklin Lakes, NJ (US)

(72) Inventors: David A. Roberts, San Jose, CA (US); Lingjie Wei, Milpitas, CA (US); Peter Mage, San Jose, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 633 days.

(21) Appl. No.: 17/160,989

(22) Filed: Jan. 28, 2021

(65) Prior Publication Data

US 2021/0270718 A1    Sep. 2, 2021

Related U.S. Application Data

(60) Provisional application No. 62/982,604, filed on Feb. 27, 2020.

(51) Int. Cl.
*G01N 15/14* (2006.01)
*G01N 21/64* (2006.01)

(52) U.S. Cl.
CPC ..... *G01N 15/1429* (2013.01); *G01N 21/6428* (2013.01); *G01N 2015/149* (2013.01); *G01N 2021/6439* (2013.01)

(58) Field of Classification Search
CPC ........... G01N 15/1429; G01N 21/6428; G01N 2015/149; G01N 21/6439; G01N 15/1459;

(Continued)

(56) References Cited

U.S. PATENT DOCUMENTS 1,084,878 A1    1/2019  Davis
2005/0275839 A1*  12/2005 Robinson .............. G01J 3/2803
356/73

(Continued)

FOREIGN PATENT DOCUMENTS

EP    0644414 A2    3/1995
JP    0644414 B1 *  11/2001  ............. G01N 15/14

(Continued)

*Primary Examiner* — Michael J Dalbo
*Assistant Examiner* — Kaleria Knox
(74) *Attorney, Agent, or Firm* — Bret E. Field; Bozicevic, Field & Francis LLP

(57) ABSTRACT

Aspects of the present disclosure include methods for adjusting a particle classification index in response to one or more saturated data signals from light detected from particles in a flow stream. Methods according to certain embodiments include detecting light from particles in a flow stream; generating a plurality of data signals from the detected light; identifying one or more saturated data signals; generating a saturated signal index that corresponds to the identified saturated data signals; and applying the saturated signal index to a particle classification index to generate an adjusted particle classification index. In some embodiments, methods include determining one or more parameters of a particle (e.g., for use in a particle sort decision) by calculating an adjusted spectral unmixing matrix for the fluorescence of the particle that excludes one or more saturated data signals. Systems and integrated circuit devices (e.g., a field programmable gate array) for practicing the subject methods are also provided. Non-transitory computer readable storage mediums are also described.

18 Claims, 9 Drawing Sheets

(58) Field of Classification Search
CPC ...... G01N 33/86; G01N 21/47; G01N 15/147; G01J 3/2803
See application file for complete search history.

(56) References Cited

U.S. PATENT DOCUMENTS

| | | | | |
|---|---|---|---|---|
| 2014/0200240 A1* | 7/2014 | Gabriel | .................. | G01N 33/86 436/501 |
| 2017/0227447 A1* | 8/2017 | Degeal | ............... | G01N 15/1459 |
| 2020/0309664 A1* | 10/2020 | Bahr | .................... | G01N 15/147 |
| 2021/0311087 A1* | 10/2021 | Miyashita | ............... | G01N 21/47 |

FOREIGN PATENT DOCUMENTS

| WO | WO2013192563 A1 | 12/2013 |
|---|---|---|
| WO | WO2017054070 A1 | 4/2017 |

\* cited by examiner

METHODS FOR IDENTIFYING SATURATED DATA SIGNALS IN CELL SORTING AND SYSTEMS FOR SAME

CROSS-REFERENCE TO RELATED APPLICATION

Pursuant to 35 U.S.C. § 119(e), this application claims priority to the filing dates of U.S. Provisional Patent Application Ser. No. 62/982,604 filed Feb. 27, 2020; the disclosure of which applications is incorporated herein by reference.

INTRODUCTION

Flow-type particle sorting systems, such as sorting flow cytometers, are used to sort particles in a fluid sample based on at least one measured characteristic of the particles. In a flow-type particle sorting system, particles, such as molecules, analyte-bound beads, or individual cells, in a fluid suspension are passed in a stream by a detection region in which a sensor detects particles contained in the stream of the type to be sorted. The sensor, upon detecting a particle of the type to be sorted, triggers a sorting mechanism that selectively isolates the particle of interest.

Particle sensing typically is carried out by passing the fluid stream by a detection region in which the particles are exposed to irradiating light, from one or more lasers, and the light scattering and fluorescence properties of the particles are measured. Particles or components thereof can be labeled with fluorescent dyes to facilitate detection, and a multiplicity of different particles or components may be simultaneously detected by using spectrally distinct fluorescent dyes to label the different particles or components. Detection is carried out using one or more photosensors to facilitate the independent measurement of the fluorescence of each distinct fluorescent dye.

To sort particles in the sample, a drop charging mechanism charges droplets of the flow stream containing a particle type to be sorted with an electrical charge at the break-off point of the flow stream. Droplets are passed through an electrostatic field and are deflected based on polarity and magnitude of charge on the droplet into one or more collection containers. Uncharged droplets are not deflected by the electrostatic field.

SUMMARY

Aspects of the present disclosure include methods for adjusting a particle classification index in response to one or more saturated data signals from light detected from particles in a flow stream. Methods according to certain embodiments include detecting light from particles in a flow stream; generating a plurality of data signals from the detected light; identifying one or more saturated data signals; generating a saturated signal index that corresponds to the identified saturated data signals; and applying the saturated signal index to a particle classification index to generate an adjusted particle classification index. In some embodiments, methods include determining one or more parameters of a particle (e.g., for use in a particle sort decision) by calculating an adjusted spectral unmixing matrix for the fluorescence of the particle that excludes one or more saturated data signals. Systems and integrated circuit devices (e.g., a field programmable gate array) for practicing the subject methods are also provided. Non-transitory computer readable storage mediums are also described.

In some embodiments, the saturated signal index is a binary word that identifies one or more detector channels that are saturated. For instance, the saturated signal index may be a binary word composed of 8 bits or more, such as a 16-bit binary word, such as a 32-bit binary word, such as a 64-bit binary word, such as a 128-bit binary word and including a 256-bit binary word. In embodiments, one or more parameters of a particle in the flow stream is determined from the generated data signals. In some instances, determining one or more parameters of the particle includes calculating a spectral unmixing matrix for fluorescence of the particle. In certain instances, samples of interest include a plurality of fluorophores where the fluorescence spectra of each fluorophore overlaps with the fluorescence spectra of at least one other fluorophore in the sample. For example, the fluorescence spectra of each fluorophore may overlap with the fluorescence spectra of at least one other fluorophore in the sample by nm or more, such as 25 nm or more and including by 50 nm or more. In some instances, the fluorescence spectra of one or more fluorophores in the sample overlaps with the fluorescence spectra of two different fluorophores in the sample, such as by 10 nm or more, such as by 25 nm or more and including by nm or more. In other embodiments, samples of interest include a plurality of fluorophores having non-overlapping fluorescence spectra. In these embodiments, the fluorescence spectra of each fluorophore is adjacent to at least one other fluorophore within 10 nm or less, such as 9 nm or less, such as 8 nm or less, such as 7 nm or less, such as 6 nm or less, such as 5 nm or less, such as 4 nm or less, such as 3 nm or less, such as 2 nm or less and including 1 nm or less.

In some embodiments, methods include adjusting the spectral unmixing matrix for fluorescence of the particle based on the calculated saturated signal index. For example, the spectral unmixing matrix may be adjusted by excluding one or more of the saturated data signals. In certain embodiments, to calculate one or more parameters of the particle in the sample methods include calculating a spectral unmixing matrix for the fluorescence of the particle; calculating an adjusted spectral unmixing matrix for the fluorescence of the particle that excludes one or more the saturated data signals; and comparing the calculated spectral unmixing matrix with the calculated adjusted spectral unmixing matrix. In certain instances, the parameters of particles in the sample are determined using an adjusted spectral unmixing matrix where one or more rows of the matrix are removed to exclude data signals from saturated input detector channels.

In some embodiments, methods include classifying particles in the sample based on one or more of the determined parameters of the particle. In certain embodiments of the present disclosure, classifying particles in the sample includes using a bitmap gating strategy where classifying particles includes identifying and in some instances, removing the saturated data signals from the particle classification parameters. In other embodiments, classifying particles in the sample includes identifying saturated data signals and estimating the true value of the data signals that are saturated. In certain instances, to classify particles in the sample, methods include generating a two-dimensional bitmap having a region of interest (ROI) and determining whether a particle should be assigned to the ROI of the bitmap. In other instances, methods for classifying particles in the sample include determining whether one or more bits of the ROI of the bitmap include a saturated data signal. In some embodiments, determining whether one or more bits of a particle-assigned ROI of the bitmap includes a saturated data signal includes applying the saturated signal index to a second two-dimensional bitmap to generate a saturated signal bitmap; comparing the generated saturated signal bitmap with the particle-assigned ROI; and determining that one or more bits of the particle-assigned ROI are saturated. To compare the saturated signal bitmap with the particle-assigned ROI, Boolean logic may be used, such as where the saturated signal bitmap is ANDed with the particle-assigned ROI to determine whether the one or more bits of the particle-assigned ROI are saturated.

Aspects of the present disclosure also include systems having a light detection system for characterizing particles of a sample in a flow stream (e.g., cells in a biological sample). Systems according to certain embodiments include a light source configured to irradiate particles of a sample in a flow stream, a light detection system having a photodetector that detects light from the particles in the sample and generates a plurality of data signals from the detected light and a processor having memory operably coupled to the processor where the memory includes instructions stored thereon which when executed by the processor cause the processor to identify one or more saturated data signals; generate a saturated signal index comprising the identified saturated data signals; and apply the saturated signal index to a particle classification index to generate an adjusted particle classification index. In some embodiments, the saturated signal index used by the processor is a binary word which identifies which detector channels have saturated the analog-digital converter. For example, the saturated signal index utilized by the subject systems may be an 8-bit binary word, a 16-bit binary word, a 32-bit binary word, a 64-bit binary word, a 128-bit binary word or a 256-bit binary word.

In embodiments, the memory includes instructions stored thereon which when executed by the processor cause the processor to determine one or more parameters of a particle in the flow stream from the generated data signals. In some embodiments, the memory includes instructions for calculating a spectral unmixing matrix for fluorescence of the particle. In some instances, the memory includes instructions for calculating an adjusted spectral unmixing matrix using the calculated saturated signal index, such as where one or more saturated data signals are excluded. In other instances, the memory includes instructions for calculating an adjusted spectral unmixing matrix where data signals from the detector channels that are saturated are excluded. In certain instances, the memory includes instructions stored thereon which when executed by the processor cause the processor to calculate a spectral unmixing matrix for the fluorescence of the particle; calculate an adjusted spectral unmixing matrix for the fluorescence of the particle that excludes one or more the saturated data signals; and compare the calculated spectral unmixing matrix with the calculated adjusted spectral unmixing matrix. In certain embodiments, the memory includes instructions for calculating a spectral unmixing matrix where one or more rows of the matrix are removed to exclude data signals from saturated input detector channels.

The memory may include instructions stored thereon, which when executed by the processor, cause the processor to classify the particle based on the one or more determined parameters of the particle. In some embodiments, the memory includes instructions for implementing a bitmap gating strategy for classifying particles. In some instances, the bitmap gating strategy implemented by the subject systems includes instructions for identifying and removing saturated data signals. In other instances, the bitmap gating strategy implemented by the subject systems includes instructions for identifying a saturated data signal and estimating the true value of the data signals that are saturated. In some embodiments, the memory includes instructions which when executed by the processor cause the processor to generate a two-dimensional bitmap having a region of interest (ROI) and determine whether a particle should be assigned to the ROI of the bitmap. In other embodiments, the memory includes instructions which when executed by the processor cause the processor to determine whether one or more bits of the ROI of the bitmap include a saturated data signal. In some instances, the memory includes instructions for determining whether one or more bits of a particle-assigned ROI of the bitmap includes a saturated data signal includes applying the saturated signal index to a second two-dimensional bitmap to generate a saturated signal bitmap; comparing the generated saturated signal bitmap with the particle-assigned ROI; and determining that one or more bits of the particle-assigned ROI are saturated. In certain instances, the processor operates using Boolean logic to compare the saturated signal bitmap with the particle-assigned ROI. For example, the saturated signal bitmap may be ANDed with the particle-assigned ROI to determine whether the one or more bits of the particle-assigned ROI are saturated.

In some embodiments, systems of interest may include one or more sort decision modules configured to generate a sorting decision for the particle based on the classification of the particle. In certain embodiments, systems further include a particle sorter (e.g., having a droplet deflector) for sorting the particles from the flow stream based on the sort decision generated by the sort decision module.

Integrated circuit devices programmed to adjust a particle classification index in response to one or more saturated data signals from light detected from particles in a flow stream are also provided. In embodiments, the integrated circuit device may be a field programmable gated array (FPGA), an application specific integrated circuit (ASIC) or a complex programmable logic device (CPLD), or some other integrated circuit device. In some embodiments, the integrated circuit device is programmed to identify one or more saturated data signals from light detected from particles in a flow stream; generate a saturated signal index comprising the identified saturated data signals; and apply the saturated signal index to a particle classification index to generate an adjusted particle classification index. In some embodiments, the saturated signal index used by the integrated circuit is a binary word which identifies the detector channel outputting a saturated data signal. For example, the saturated signal index utilized by the subject systems may be an 8-bit binary word, a 16-bit binary word, a 32-bit binary word, a 64-bit binary word, a 128-bit binary word or a 256-bit binary word.

In embodiments, integrated circuit devices of interest are programmed to determine one or more parameters of a particle in the flow stream from the generated data signals. In some embodiments, the integrated circuit is programmed to calculate a spectral unmixing matrix for fluorescence of the particle. In some instances, the integrated circuit is programmed to calculate an adjusted spectral unmixing matrix using the calculated saturated signal index. For example the integrated circuit may be programmed to calculate the spectral unmixing matrix and exclude one or more saturated data signals. In other instances, the integrated circuit is programmed to calculate an adjusted spectral unmixing matrix where data signals from the detector channels that are saturated are excluded. In certain instances, the integrated circuit is programmed to calculate a spectral unmixing matrix for the fluorescence of the particle; calculate an adjusted spectral unmixing matrix for the fluorescence of the particle that excludes one or more the saturated data signals; and compare the calculated spectral unmixing matrix with the calculated adjusted spectral unmixing matrix. In certain embodiments, integrated circuits are programmed to calculate a spectral unmixing matrix where one or more rows of the matrix are removed to exclude data signals from saturated input detector channels.

The integrated circuit is programmed to classify the particle based on the one or more determined parameters of the particle. In some embodiments, the integrated circuit is programmed for implementing a bitmap gating strategy for classifying particles. In some instances, the bitmap gating strategy implemented by the integrated circuit includes programming for identifying and removing saturated data signals. In other instances, the bitmap gating strategy implemented by the integrated circuit includes programming for identifying a saturated data signal and estimating the true value of the data signals that are saturated. In some embodiments, the integrated circuit device is programmed to generate a two-dimensional bitmap having a region of interest (ROI) and determine whether a particle should be assigned to the ROI of the bitmap. In other embodiments, the integrated circuit is programmed to determine whether one or more bits of the ROI of the bitmap include a saturated data signal. In some instances, the integrated circuit is programmed to determine whether one or more bits of a particle-assigned ROI of the bitmap includes a saturated data signal by including programming to apply the saturated signal index to a second two-dimensional bitmap to generate a saturated signal bitmap; compare the generated saturated signal bitmap with the particle-assigned ROI; and determine that one or more bits of the particle-assigned ROI are saturated. In certain instances, the integrated circuit operates using Boolean logic to compare the saturated signal bitmap with the particle-assigned ROI. For example, the saturated signal bitmap may be ANDed with the particle-assigned ROI to determine whether the one or more bits of the particle-assigned ROI are saturated. In certain instances, the integrated circuit devices are programmed to sort the particles of the sample based on the adjusted particle classifications.

Aspects of the present disclosure also include a non-transitory computer readable storage medium for adjusting a particle classification index in response to one or more saturated data signals from light detected from particles in a flow stream. Non-transitory computer readable storage mediums according to certain embodiments include instructions stored thereon having algorithm for detecting light from particles in the flow stream, algorithm for generating a plurality of data signals from the detected light, algorithm for generating a saturated signal index that corresponds to the identified saturated data signals and algorithm for applying the saturated signal index to a particle classification index to generate an adjusted particle classification index. The non-transitory computer readable storage medium may also include algorithm for calculating one or more parameters of the particle. In these embodiments, the computer readable storage medium includes algorithm for calculating a spectral unmixing matrix for the fluorescence of the particle, algorithm for calculating an adjusted spectral unmixing matrix for the fluorescence of the particle that excludes one or more the saturated data signals and algorithm for comparing the calculated spectral unmixing matrix with the calculated adjusted spectral unmixing matrix. In certain embodiments, the non-transitory computer readable storage medium may also include algorithm for generating a two-dimensional bitmap comprising a region of interest (ROI) and algorithm for assigning the particle to an ROI of the two-dimensional bitmap. In certain instances, the non-transitory computer readable storage medium may also include algorithm for applying the saturated signal index to a second two-dimensional bitmap to generate a saturated signal bitmap, algorithm for comparing the generated saturated signal bitmap with the particle assigned ROI and algorithm for identifying that one or more bits of the particle assigned ROI are saturated. In some instances, the non-transitory computer readable storage medium includes algorithm for generating a particle sorting decision based on the adjusted particle classification index.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
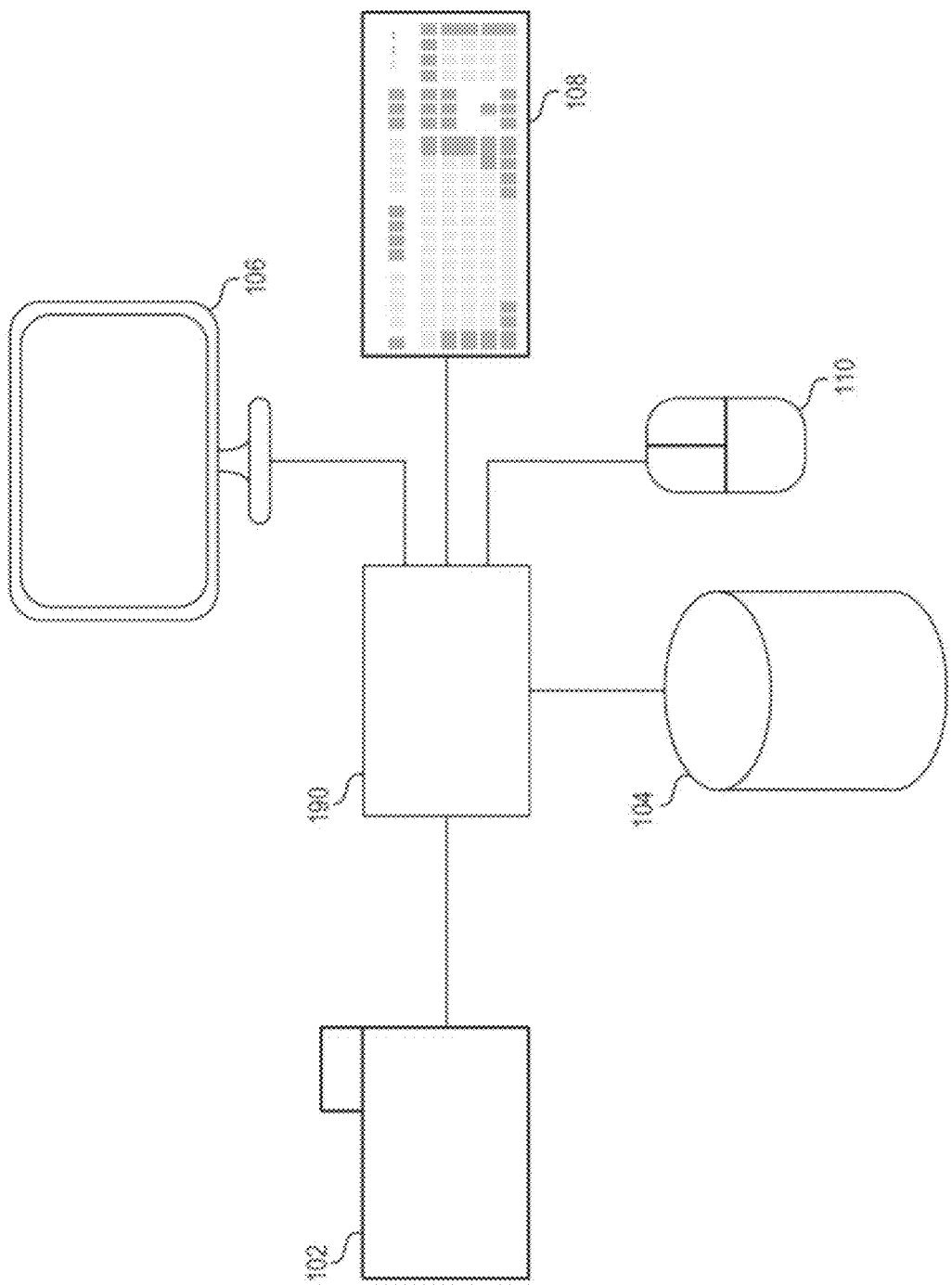
FIG. 1 depicts a functional block diagram for one example of a sorting control system according to certain embodiments.

Aspects of the present disclosure include methods for adjusting a particle classification index in response to one or more saturated data signals from light detected from particles in a flow stream. Methods according to certain embodiments include detecting light from particles in a flow stream; generating a plurality of data signals from the detected light; identifying one or more saturated data signals; generating a saturated signal index that corresponds to the identified saturated data signals; and applying the saturated signal index to a particle classification index to generate an adjusted particle classification index. In some embodiments, methods include determining one or more parameters of a particle (e.g., for use in a particle sort decision) by calculating an adjusted spectral unmixing matrix for the fluorescence of the particle that excludes one or more saturated data signals. Systems and integrated circuit devices (e.g., a field programmable gate array) for practicing the subject methods are also provided. Non-transitory computer readable storage mediums are also described.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides methods for adjusting a particle classification index in response to one or more saturated data signals from light detected from particles in a flow stream. In further describing embodiments of the disclosure, methods for generating a plurality of data signals from light detected from a sample in a flow stream; generating a saturated signal index from one or more identified saturated data signals; and generating an adjusted particle classification index using the saturated signal index are first described in greater detail. Next, systems and integrated circuited devices programmed to practice the subject methods are described. Non-transitory computer readable storage mediums are also described.

Methods for Adjusting a Particle Classification Index in Response to Saturated Data Signals Aspects of the present disclosure include methods for adjusting a particle classification index in response to one or more saturated data signals from light detected from particles in a flow stream. The phrase "saturated signal" is used herein in its conventional sense to refer to a signal which exceeds the maximal range that can be measured by one or more components of the light detection systems (described in greater detail below). In some embodiments, a saturated signal is a data signal output from a photodetector exposed to an amount of light which exceeds the maximal amount that can be detected by the photodetector. In other embodiments, a saturated signal is a data signal which exceeds the maximal range of an analog-to-digital convertor that is used to convert an analog signal from a photodetector to a digital signal. As described in greater detail herein, the subject methods according to certain embodiments provide for identifying one or more saturated data signals from light detected from particles in a flow stream and removing the saturated data signals when classifying one or more particles in the flow stream. In other embodiments, the subject methods provide for identifying one or more saturated data signals and estimating a true value of the data signals that are saturated. Classifying particles according to the subject methods results in increased accuracy, such as improved accuracy in assigning a particle to a particle population cluster. When used as part of a particle sorting decision, the subject methods can improve the yield of particle sorting as well as the purity of a sorted particle.

In practicing the subject methods, a sample having particles is irradiated with a light source and light from the sample is detected with a light detection system having one or more photodetectors. In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In embodiments, a sample (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the sample with one or more lasers. As discussed above, the type and number of lasers will vary depending on the sample as well as desired light collected and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the methods include irradiating the flow stream with a dye laser, such as a stilbene, coumarin or rhodamine laser. In yet other instances, methods include irradiating the flow stream with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the flow stream with a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

The sample may be irradiated with one or more of the above mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In certain embodiments, methods include irradiating the sample with two or more beams of frequency shifted light. As described above, a light beam generator component may be employed having a laser and an acousto-optic device for frequency shifting the laser light. In these embodiments, methods include irradiating the acousto-optic device with the laser. Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than one laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where the acousto-optic device is sequentially irradiated with two or more lasers, the duration the acousto-optic device is irradiated by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where the acousto-optic device is sequentially irradiated by more than two (i.e., 3 or more) lasers, the delay between irradiation by each laser may be the same or different.

The acousto-optic device may be irradiated continuously or in discrete intervals. In some instances, methods include irradiating the acousto-optic device with the laser continuously. In other instances, the acousto-optic device is irradiated with the laser in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the laser, the acousto-optic device may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In embodiments, methods include applying radiofrequency drive signals to the acousto-optic device to generate angularly deflected laser beams. Two or more radiofrequency drive signals may be applied to the acousto-optic device to generate an output laser beam with the desired number of angularly deflected laser beams, such as 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including 100 or more radiofrequency drive signals.

The angularly deflected laser beams produced by the radiofrequency drive signals each have an intensity based on the amplitude of the applied radiofrequency drive signal. In some embodiments, methods include applying radiofrequency drive signals having amplitudes sufficient to produce angularly deflected laser beams with a desired intensity. In some instances, each applied radiofrequency drive signal independently has an amplitude from about 0.001 V to about 500 V, such as from about 0.005 V to about 400 V, such as from about V to about 300 V, such as from about 0.05 V to about 200 V, such as from about 0.1 V to about 100 V, such as from about 0.5 V to about 75 V, such as from about 1 V to 50 V, such as from about 2 V to about 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In these embodiments, the angularly deflected laser beams in the output laser beam are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, the flow stream is irradiated with a plurality of beams of frequency-shifted light and a cell in the flow stream is imaged by fluorescence imaging using radiofrequency tagged emission (FIRE) to generate a frequency-encoded image, such as those described in Diebold, et al. *Nature Photonics* Vol. 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

As discussed above, in embodiments light from the irradiated sample is conveyed to a light detection system as described in greater detail below and measured by the plurality of photodetectors. In some embodiments, methods include measuring the collected light over a range of wavelengths (e.g., 200 nm-1000 nm). For example, methods may include collecting spectra of light over one or more of the wavelength ranges of 200 nm-1000 nm. In yet other embodiments, methods include measuring collected light at one or more specific wavelengths. For example, the collected light may be measured at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, methods including measuring wavelengths of light which correspond to the fluorescence peak wavelength of fluorophores. In some embodiments, methods include measuring collected light across the entire fluorescence spectrum of each fluorophore in the sample.

The collected light may be measured continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

Light from the sample may be measured at one or more wavelengths of, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring the collected light at 400 or more different wavelengths.

Methods of the present disclosure include adjusting a particle classification index in response to one or more saturated data signals from light detected from particles in a flow stream. In embodiments, a plurality of data signals are generated from the light detected from particles in the sample. The data signals generated may be analog data signals or digital data signals. Where the data signals are analog data signals, in some instances, methods include converting the analog data signals to digital data signals, such as with an analog-to-digital converter. In practicing the subject methods, one or more saturated data signals are identified. In some instances, the saturated data signals are attributed to a signal exceeding the range that the detector can measure. In other instances, the saturated data signals are attributed to a signal exceeding the range of the analog-to-digital converter. Depending on the number of photodetectors used to detect the light from the particles in the flow stream, the number of detector channels identified as outputting a saturated data signal may vary, such as 1 or more, such as 2 or more, such as 4 or more, such as 8 or more, such as 16 or more, such as 32 or more, such as 64 or more and including 128 or more.

In embodiments, a saturation signal index is generated from the identified saturated data signals. In some embodiments, the saturation signal index is a binary word that identifies which detector channels have saturated the analog-digital converter. In some instances, the saturation signal index is a binary word composed of 1 bit or more, such as 2 bits or more, such as 4 bits or more, such as 8 bits or more, such as 16 bits or more, such as 32 bits or more, such as 64 bits or more, such as 128 bits or more and including 256 bits or more. For example, the saturation signal index may be a 4-bit binary word, an 8-bit binary word, a 16-bit binary word, a 32-bit binary word, a 64-bit binary word, a 128-bit binary word or a 256-bit binary word. In certain instances, the saturation signal index is a combination of two or more binary words, such as 3 or more, such as 4 or more, such as 5 or more, such as 6 or more, such as 7 or more, such as 8 or more, such as 9 or more and including 10 or more binary words. Where the saturation signal index is a combination of binary words, each binary word may independently be a binary word composed of 1 bit or more, such as 2 bits or more, such as 4 bits or more, such as 8 bits or more, such as 16 bits or more, such as 32 bits or more, such as 64 bits or more, such as 128 bits or more and including 256 bits or more. In some embodiments, each binary word in the saturation signal index may independently be a 4-bit binary word, an 8-bit binary word, a 16-bit binary word, a 32-bit binary word, a 64-bit binary word, a 128-bit binary word or a 256-bit binary word. For example, where a light detection system includes 80 detector channels, the saturation signal index may be composed of a 128-bit binary word or three different 32-bit binary words.

In embodiments, methods include determining one or more parameters of a particle in the flow stream from the generated data signals. In some embodiments determining one or more parameters of the particle includes resolving light from a plurality of fluorophores in the sample, such as resolving light detected from fluorophores having overlapping fluorescence. In some embodiments, determining parameters of particles in the flow stream include calculating a spectral unmixing matrix for the fluorescence from the sample. In some embodiments, spectrally resolving light from fluorophores in the sample includes calculating the spectral unmixing matrix using a weighted least squares algorithm. In some instances, the weighted least squares algorithm is calculated according to:

$$\hat{a} = (X^T W X)^{-1} X^T W y$$

where y is measured detector values from the plurality of photodetectors of the light detection system for each cell; $\hat{a}$ is estimated fluorophore abundance X is spillover; and W is $$\begin{bmatrix} W_{ii} & 0 & \cdots & 0 \\ 0 & W_{i+1,i+1} & \cdots & 0 \\ \vdots & \vdots & \ddots & \vdots \\ 0 & 0 & \cdots & W_{i+n,i+n} \end{bmatrix}$$

In some embodiments, each $W_{ii}$ is calculated according to:

$$W_{ii} = \frac{1}{\sigma_i^2} \approx \frac{1}{y_i + \lambda_i}$$

where $\sigma_i^2$ is variance at detector i; $y_i$ is signal at detector i; and $\lambda_i$ is constant noise at detector i. In certain embodiments, the spectral unmixing matrix is calculated according to: $(X^T W X)^{-1} X^T W$. In some instances, the method comprises inverting $(X^T W X)$ for each cell detected by the light detection system to calculate a spectral unmixing matrix. In some embodiments, methods include calculating a solution to the spectral unmixing matrix using one or more of an iterative Newton-Raphson calculation, a Sherman-Morrison iterative inverse updater, by matrix decomposition (e.g., an LU matrix decomposition, a Gaussian elimination, a modified Cholesky decomposition) or singular value decomposition (SVD). In certain embodiments, the solution to the spectral unmixing matrix is calculated as described in U.S. patent application Ser. No. 16/725,799 filed on Dec. 23, 2019, the disclosure of which is herein incorporated by reference.

In some embodiments, methods include adjusting the spectral unmixing matrix for fluorescence of particles in the sample based on the calculated saturated signal index. For example, the spectral unmixing matrix may be adjusted by excluding one or more of the saturated data signals. In certain embodiments, to calculate one or more parameters of the particle in the sample methods include calculating a spectral unmixing matrix for the fluorescence of the particle; calculating an adjusted spectral unmixing matrix for the fluorescence of the particle that excludes one or more the saturated data signals; and comparing the calculated spectral unmixing matrix with the calculated adjusted spectral unmixing matrix. In certain instances, the spectral unmixing matrix is adjusted by removing one or more rows of the matrix based on the data signals from saturated input detector channels. In other instances, saturation signal index is used to identify the detector channels that are saturated and the spectral unmixing matrix is adjusted to compensate for the saturated signal. In one example, the spectral unmixing matrix solution is adjusted to use an estimate of the true value of the saturated signal. In these embodiments, the estimated true value of the saturated signal is first determined and is inputted into the spectral unmixing matrix to generate an adjusted spectral unmixing matrix solution.

In some embodiments, methods include classifying a particle in the sample based on one or more determined parameters of the particle. In some embodiments, classifying a particle includes assigning the particle to a particle population cluster. In other embodiments, classifying a particle includes plotting one or more parameters of the particle onto a scatter plot.

In certain embodiments, classifying particles in the sample includes using a bitmap gating strategy where classifying particles includes identifying and removing the identified saturated data signals from the particle classification parameters. In other embodiments, classifying particles in the sample includes identifying saturated data signals and estimating the true value of the data signals that are saturated. In certain instances, to classify particles in the sample, methods include generating a two-dimensional bitmap having a region of interest (ROI) and determining whether a particle should be assigned to the ROI of the bitmap. In other instances, methods for classifying particles in the sample include determining whether one or more bits of the ROI of the bitmap include a saturated data signal. In some embodiments, determining whether one or more bits of a particle-assigned ROI of the bitmap includes a saturated data signal includes applying the saturated signal index to a second two-dimensional bitmap to generate a saturated signal bitmap; comparing the generated saturated signal bitmap with the particle-assigned ROI; and determining that one or more bits of the particle-assigned ROI are saturated.

Where one or more bits of the ROI of the bitmap are saturated, methods according to some embodiments include adjusting a particle classification index using the saturation signal index. In some instances, the coordinates used for the ROI are indices that are scaled into the addressable range of the bitmap. In some instances, one or more offsets are applied. In other instances, one or more scaling factors are applied. In certain instances, methods include applying one or more offsets followed by applying one or more scaling factors. In certain embodiments, methods include converting the saturation signal index into a scalar value before applying the saturation signal index to determine whether one or more bits of the particle-assigned ROI of the bitmap include a saturated data signal. In some instances, the X and Y inputs into the ROI bitmaps are selected from a data frame from the data signals. In these instances, an integer is subtracted (e.g., by Affine transformation) followed by multiplying by a scale factor. In some embodiments, a contiguous subset of the bits are used to select the index into the bitmap. (e.g., bits 31-25 selected from a 64-bit multiplication product). In some embodiments, the saturation signal index is applied to the ROI of the bitmap. To compare the saturated signal bitmap with the particle-assigned ROI, Boolean logic may be used, such as where the saturated signal bitmap is ANDed with the particle-assigned ROI to determine whether the one or more bits of the particle-assigned ROI are saturated. In these embodiments, a Boolean true of false can be obtained indicating whether the event is saturated in any detector channels. These results can be combined with the particle-assigned ROI determination to include an unsaturated condition to the classification decision.

Figure 5:
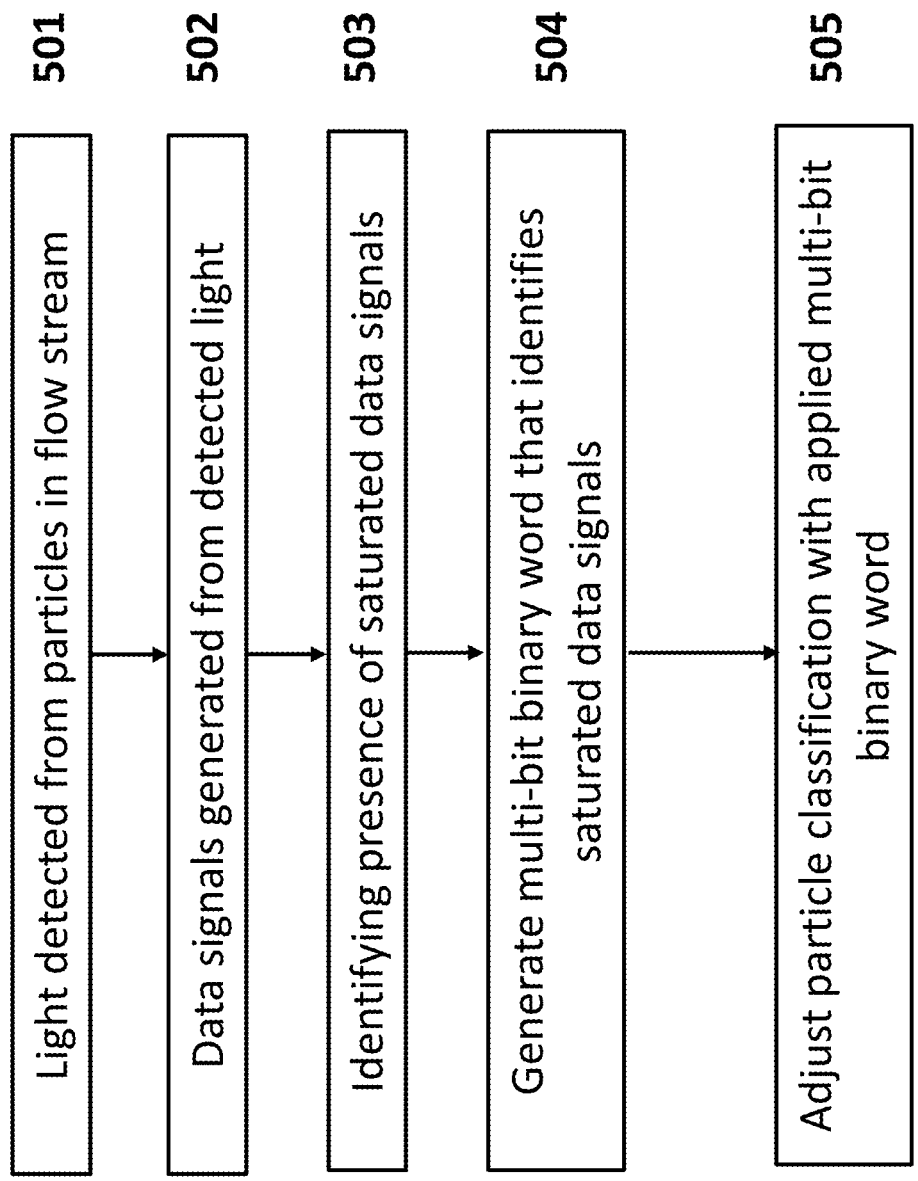
FIG. 5 depicts a flow diagram for generating an adjusted particle classification index according to certain embodiments.
Figure 6:
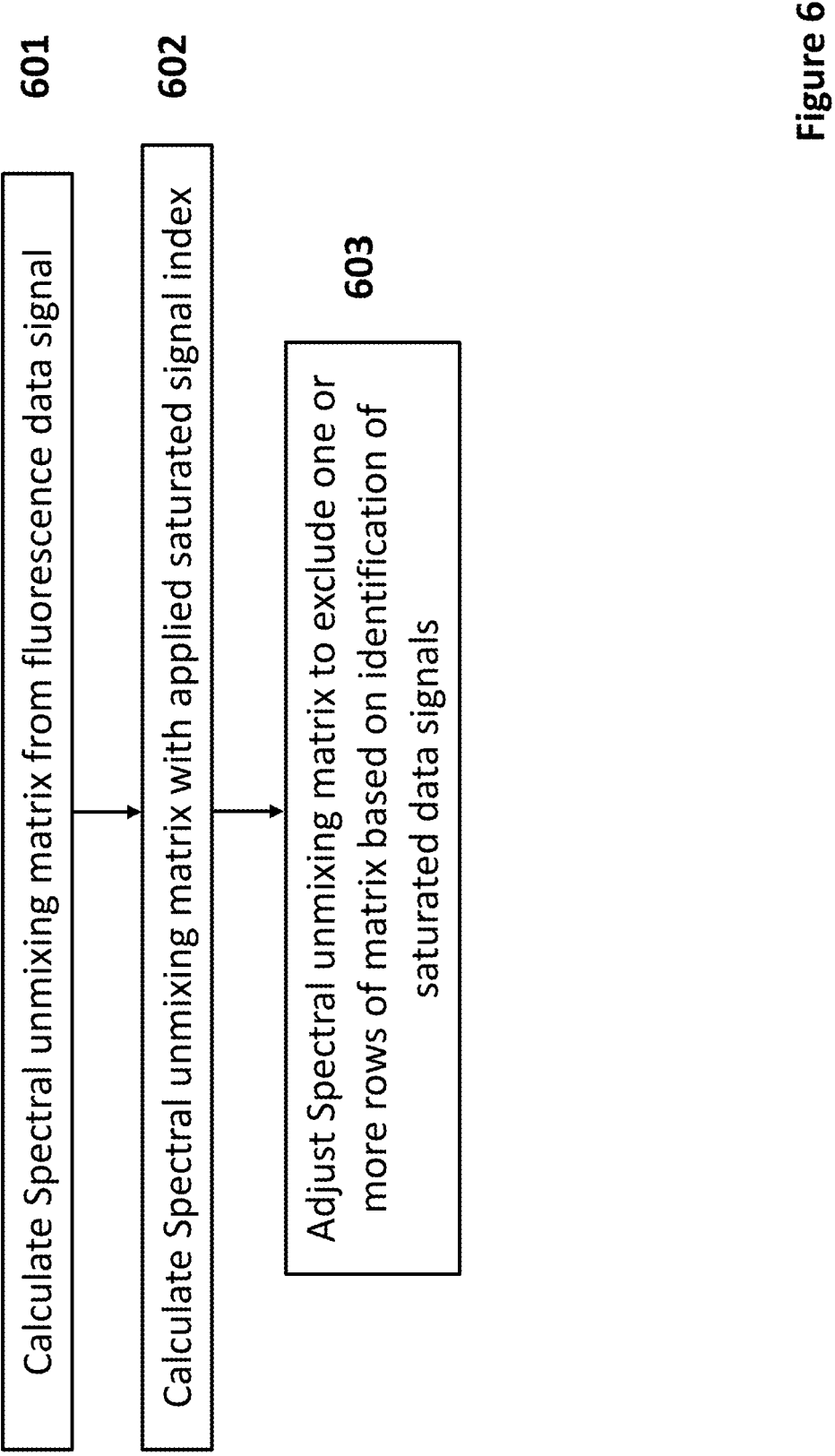
FIG. 6 depicts a flow diagram of using a multi-bit binary word saturated signal index to generate an adjusted particle classification according to certain embodiments.

FIG. 5 depicts a flow diagram for generating an adjusted particle classification index according to certain embodiments. At step 501, light from a sample in a flow stream is detected. A light detection system generates a plurality of data signals from the detected light at step 502 and one or more saturated data signals may be detected at step 503. The saturated data signals may be the result of a detector exceeding the amount of light that the detector can measure or where the signal inputted exceeds the range of an analog-to-digital converter. A saturated signal index in the form of a multi-bit binary word is generated at step 504 and identifies the detector channels which are saturated. At step 505, the multi-bit binary word saturated signal index is applied to the generation of a particle classification decision FIG. 6 depicts a flow diagram of using a multi-bit binary word saturated signal index to generate an adjusted particle classification according to certain embodiments. At step 601, a spectral unmixing matrix for fluorescence of a particle in the sample is calculated without applying the saturated signal index. An adjusted spectral unmixing matrix solution is calculated at step 602 by applying the saturated signal index to identify which detector channels are saturated. At step 603, the unadjusted spectral unmixing matrix is compared with the adjusted spectral unmixing matrix and one or more rows of the spectral unmixing matrix may be excluded based on the comparison between the unadjusted spectral unmixing matrix and the adjusted spectral unmixing matrix.

Figure 7:
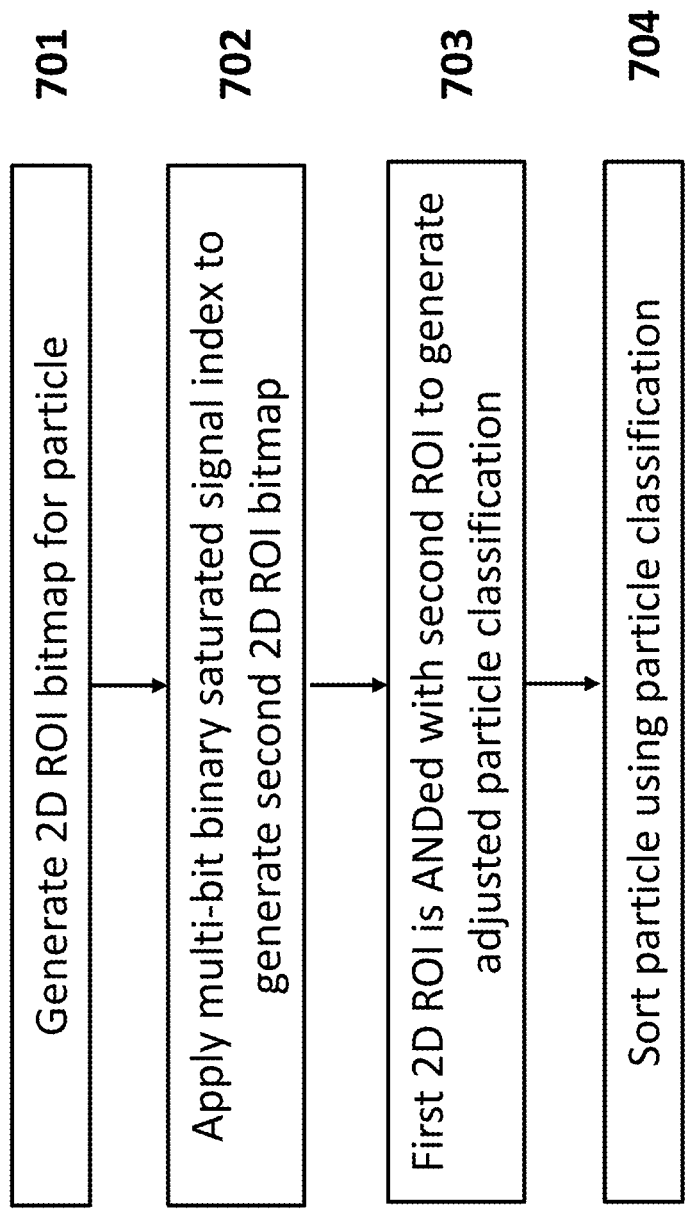
FIG. 7 depicts a flow diagram for classifying a particle according to certain embodiments.

FIG. 7 depicts a flow diagram for classifying a particle according to certain embodiments. At step 701, a particle classification two-dimensional bitmap having a region of interest (ROI) is generated. At step 702, the saturated signal index is applied to generate a second two-dimensional bitmap ROI where the axes of the ROI identify the saturated channels. Using Boolean logic, the second two-dimensional bitmap ROI with identified saturated channels is ANDed with the particle classification two-dimensional bitmap at step 703 to generate an adjusted particle classification that takes into account saturated detector channels. At step 704, the particle is sorted based on the determined particle classification.

In some embodiments, methods include generating a sort classification. In some instances, the sort classification may be a particle sorting decision. For example, generating a sort classification may include identifying a sorting gate suitable for sorting the particle based on the calculated parameters of the particle in combination with the determined saturated signal index. The particle sorting decision may be generated based on the overlap between the calculated parameters of the particle and the parameters of the particle classifications that are adjusted by applying the saturated signal index. To select an appropriate gate, methods may further include plotting the parameters (e.g., on a scatter plot) so as to obtain the best separation of subpopulations possible. This analysis may be conveyed to a sorting system which is configured to generate a set of digitized parameters based on the particle classification.

In some embodiments, methods for sorting components of sample include sorting particles (e.g., cells in a biological sample) with a particle sorting module having deflector plates, such as described in U.S. Patent Publication No. 2017/0299493, filed on Mar. 28, 2017, the disclosure of which is incorporated herein by reference. In certain embodiments, cells of the sample are sorted using a sort decision module having a plurality of sort decision units, such as those described in U.S. Provisional Patent Application No. 62/803,264, filed on Feb. 8, 2019, the disclosure of which is incorporated herein by reference.

Systems for Adjusting a Particle Classification Index in Response to Saturated Data Signals As summarized above, aspects of the present disclosure include a system that is configured to adjust a particle classification index in response to one or more saturated data signals from light detected from particles in a flow stream. As described above, the term "saturated signal" is used to refer to a signal which exceeds the maximal range that can be measured by one or more components of the light detection systems described below. In some embodiments, a saturated signal is a data signal output from a photodetector exposed to an amount of light which exceeds the maximal amount that can be detected by the photodetector. In other embodiments, a saturated signal is a data signal which exceeds the maximal range of an analog-to-digital convertor that is used to convert an analog signal from a photodetector to a digital signal. Systems according to certain embodiments include a light source configured to irradiate particles of a sample in a flow stream, a light detection system having a photodetector that detects light from the particles in the sample and generates a plurality of data signals from the detected light and a processor having memory operably coupled to the processor where the memory includes instructions stored thereon which when executed by the processor cause the processor to identify one or more saturated data signals; generate a saturated signal index comprising the identified saturated data signals; and apply the saturated signal index to a particle classification index to generate an adjusted particle classification index.

In embodiments, the light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm. In certain embodiments, the light source is a laser. In some instances, the subject systems include a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, $Nd:YVO_4$ laser, $Nd:YCa_4O(BO_3)_3$ laser, Nd:YCOB laser, titanium sapphire laser, thulim YAG laser, ytterbium YAG laser, $ytterbium_2O_3$ laser or cerium doped lasers and combinations thereof.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, an multi-LED integrated. In some instances, the non-laser light source is a stabilized fiber-coupled broadband light source, white light source, among other light sources or any combination thereof.

The light source may be positioned any suitable distance from the sample (e.g., the flow stream in a flow cytometer), such as at a distance of 0.001 mm or more from the flow stream, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source irradiate the sample at any suitable angle (e.g., relative the vertical axis of the flow stream), such as at an angle ranging from 10° to 90°, such as from 15° to 85°, such as from 20° to 80°, such as from 25° to 75° and including from 30° to 60°, for example at a 90° angle.

The light source may be configured to irradiate the sample continuously or in discrete intervals. In some instances, systems include a light source that is configured to irradiate the sample continuously, such as with a continuous wave laser that continuously irradiates the flow stream at the interrogation point in a flow cytometer. In other instances, systems of interest include a light source that is configured to irradiate the sample at discrete intervals, such as every 0.001 milliseconds, every 0.01 milliseconds, every 0.1 milliseconds, every 1 millisecond, every 10 milliseconds, every 100 milliseconds and including every 1000 milliseconds, or some other interval. Where the light source is configured to irradiate the sample at discrete intervals, systems may include one or more additional components to provide for intermittent irradiation of the sample with the light source. For example, the subject systems in these embodiments may include one or more laser beam choppers, manually or computer controlled beam stops for blocking and exposing the sample to the light source.

In some embodiments, the light source is a laser. Lasers of interest may include pulsed lasers or continuous wave lasers. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, $Nd:YVO_4$ laser, $Nd:YCa_4O(BO_3)_3$ laser, Nd:YCOB laser, titanium sapphire laser, thulim YAG laser, ytterbium YAG laser, $ytterbium_2O_3$ laser or cerium doped lasers and combinations thereof; a semiconductor diode laser, optically pumped semiconductor laser (OPSL), or a frequency doubled- or frequency tripled implementation of any of the above mentioned lasers.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. For example lasers in light beam generators of interest may be a gas laser, such as a helium-neon laser, argon laser, krypton laser, xenon laser, nitrogen laser, CO2 laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO4 laser, Nd:YCa4O(BO3)3 laser, Nd:YCOB laser, titanium sapphire laser, thulim YAG laser, ytterbium YAG laser, ytterbium2O3 laser or cerium doped lasers and combinations thereof.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 μm or more, such as by 0.005 μm or more, such as by 0.01 μm or more, such as by 0.05 μm or more, such as by 0.1 μm or more, such as by 0.5 μm or more, such as by 1 μm or more, such as by 5 μm or more, such as by 10 μm or more, such as by 100 μm or more, such as by 500 μm or more, such as by 1000 μm or more and including by 5000 μm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 μm or more, such as an overlap of μm or more, such as an overlap of 0.01 μm or more, such as an overlap of 0.05 μm or more, such as an overlap of 0.1 μm or more, such as an overlap of μm or more, such as an overlap of 1 μm or more, such as an overlap of 5 μm or more, such as an overlap of 10 μm or more and including an overlap of 100 μm or more.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference.

In embodiments, systems include a light detection system having a one or more photodetectors. Photodetectors of interest may include, but are not limited to optical sensors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from a sample is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors.

In some embodiments, light detection systems of interest include a plurality of photodetectors. In some instances, the light detection system includes a plurality of solid-state detectors such as photodiodes. In certain instances, the light detection system includes a photodetector array, such as an array of photodiodes. In these embodiments, the photodetector array may include 4 or more photodetectors, such as 10 or more photodetectors, such as or more photodetectors, such as 50 or more photodetectors, such as 100 or more photodetectors, such as 250 or more photodetectors, such as 500 or more photodetectors, such as 750 or more photodetectors and including 1000 or more photodetectors. For example, the detector may be a photodiode array having 4 or more photodiodes, such as 10 or more photodiodes, such as 25 or more photodiodes, such as 50 or more photodiodes, such as 100 or more photodiodes, such as 250 or more photodiodes, such as 500 or more photodiodes, such as 750 or more photodiodes and including 1000 or more photodiodes.

The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodetectors in the photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodetector array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the photodetector array has a rectangular-shaped active surface.

Each photodetector (e.g., photodiode) in the array may have an active surface with a width that ranges from 5 μm to 250 μm, such as from 10 μm to 225 μm, such as from 15 μm to 200 μm, such as from 20 μm to 175 μm, such as from 25 μm to 150 μm, such as from 30 μm to 125 μm and including from 50 μm to 100 μm and a length that ranges from 5 μm to 250 μm, such as from 10 μm to 225 μm, such as from 15 μm to 200 μm, such as from 20 μm to 175 μm, such as from 25 μm to 150 μm, such as from 30 μm to 125 μm and including from 50 μm to 100 μm, where the surface area of each photodetector (e.g., photodiode) in the array ranges from 25 to μm$^2$ to 10000 μm$^2$, such as from 50 to μm$^2$ to 9000 μm$^2$, such as from 75 to μm$^2$ to 8000 μm$^2$, such as from 100 to μm$^2$ to 7000 μm$^2$, such as from 150 to μm$^2$ to 6000 μm$^2$ and including from 200 to μm$^2$ to 5000 μm$^2$.

The size of the photodetector array may vary depending on the amount and intensity of the light, the number of photodetectors and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodetector array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodetector array may range from 0.1 mm 2 to 10000 mm$^2$, such as from 0.5 mm 2 to 5000 mm$^2$, such as from 1 mm 2 to 1000 mm$^2$, such as from 5 mm 2 to 500 mm$^2$, and including from 10 mm 2 to 100 mm$^2$.

Photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, photodetectors are configured to measure collected light over a range of wavelengths (e.g., 200 nm-1000 nm). In certain embodiments, photodetectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light from the sample in the flow stream at one or more specific wavelengths. For example, systems may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, photodetectors may be configured to be paired with specific fluorophores, such as those used with the sample in a fluorescence assay. In some embodiments, photodetectors are configured to measure collected light across the entire fluorescence spectrum of each fluorophore in the sample.

The light detection system is configured to measure light continuously or in discrete intervals. In some instances, photodetectors of interest are configured to take measurements of the collected light continuously. In other instances, the light detection system is configured to take measurements in discrete intervals, such as measuring light every 0.001 millisecond, every 0.01 millisecond, every millisecond, every 1 millisecond, every 10 milliseconds, every 100 milliseconds and including every 1000 milliseconds, or some other interval.

In embodiments, systems are configured to adjust a particle classification index in response to one or more saturated data signals from light detected from particles in a flow stream. Light detection systems are configured to generate a plurality of data signals from the light detected from particles in the sample. The data signals generated may be analog data signals or digital data signals. Where the data signals are analog data signals, in some instances, systems further include an analog-to-digital converter configured to convert the analog data signals to digital data signals. Systems of interest include a processor having memory operably coupled to the processor where the memory includes instructions stored thereon which when executed by the processor cause the processor to identify one or more saturated data signals. In some instances, the saturated signals are data signals that are attributed to a signal exceeding the range that the detectors of the light detection system can measure. In other instances, the saturated signals are data signals attributed to a signal exceeding the range of the analog-to-digital converter. Depending on the number of photodetectors in the subject light detection systems, the number of detector channels that may be identified as outputting a saturated data signal may vary, such as 1 or more, such as 2 or more, such as 4 or more, such as 8 or more, such as 16 or more, such as 32 or more, such as 64 or more and including 128 or more.

In some embodiments, the saturated signal index generated by the processor from the identified saturated data signals is a binary word which identifies which detector channels have saturated the analog-digital converter. In some instances, the saturation signal index is a binary word composed of 1 bit or more, such as 2 bits or more, such as 4 bits or more, such as 8 bits or more, such as 16 bits or more, such as 32 bits or more, such as 64 bits or more, such as 128 bits or more and including 256 bits or more. For example, the saturation signal index may be a 4-bit binary word, an 8-bit binary word, a 16-bit binary word, a 32-bit binary word, a 64-bit binary word, a 128-bit binary word or a 256-bit binary word. In certain instances, the saturation signal index is a combination of two or more binary words, such as 3 or more, such as 4 or more, such as 5 or more, such as 6 or more, such as 7 or more, such as 8 or more, such as 9 or more and including 10 or more binary words. Where the saturation signal index is a combination of binary words, each binary word may independently be a binary word composed of 1 bit or more, such as 2 bits or more, such as 4 bits or more, such as 8 bits or more, such as 16 bits or more, such as 32 bits or more, such as 64 bits or more, such as 128 bits or more and including 256 bits or more. In some embodiments, each binary word in the saturation signal index may independently be a 4-bit binary word, an 8-bit binary word, a 16-bit binary word, a 32-bit binary word, a 64-bit binary word, a 128-bit binary word or a 256-bit binary word. For example, where a light detection system includes 80 detector channels, the saturation signal index may be composed of a 128-bit binary word or three different 32-bit binary words.

In embodiments, the memory includes instructions stored thereon which when executed by the processor cause the processor to determine one or more parameters of a particle in the flow stream from the generated data signals. In some embodiments, the memory includes instructions for calculating a spectral unmixing matrix for fluorescence of the particle. In some embodiments, the memory includes instructions for calculating a spectral unmixing matrix using a weighted least squares algorithm. In some instances, the weighted least squares algorithm is calculated according to:

$$\hat{a} = (X^T W X)^{-1} X^T W y$$

where y is measured detector values from the plurality of photodetectors of the light detection system for each cell; $\hat{a}$ is estimated fluorophore abundance X is spillover; and W is $$\begin{bmatrix} W_{ii} & 0 & \cdots & 0 \\ 0 & W_{i+1,i+1} & \cdots & 0 \\ \vdots & \vdots & \ddots & \vdots \\ 0 & 0 & \cdots & W_{i+n,i+n} \end{bmatrix}$$

In some embodiments, each $W_{ii}$ is calculated according to:

$$W_{ii} = \frac{1}{\sigma_i^2} \approx \frac{1}{y_i + \lambda_i}$$

where $\sigma_i^2$ is variance at detector i; $y_i$ is signal at detector i; and $\lambda_i$ is constant noise at detector i. In certain embodiments, the spectral unmixing matrix is calculated according to: $(X^T W X)^{-1} X^T W$. In some instances, the method comprises inverting $(X^T W X)$ for each cell detected by the light detection system detection system to calculate a spectral unmixing matrix. In some embodiments, the memory includes instructions stored thereon which when executed by the processor cause the processor to calculate a solution to the spectral unmixing matrix using one or more of an iterative Newton-Raphson calculation, a Sherman-Morrison iterative inverse updater, by matrix decomposition (e.g., an LU matrix decomposition, a Gaussian elimination, a modified Cholesky decomposition) or singular value decomposition (SVD). In certain embodiments, the systems for calculating a solution to the spectral unmixing matrix include those described in U.S. patent application Ser. No. 16/725,799 filed on Dec. 23, 2019, the disclosure of which is herein incorporated by reference.

In some instances, the memory includes instructions for calculating an adjusted spectral unmixing matrix using the calculated saturated signal index, such as where one or more saturated data signals are excluded. In other instances, the memory includes instructions for calculating an adjusted spectral unmixing matrix where data signals from the detector channels that are saturated are excluded. In certain instances, the memory includes instructions stored thereon which when executed by the processor cause the processor to calculate a spectral unmixing matrix for the fluorescence of the particle; calculate an adjusted spectral unmixing matrix for the fluorescence of the particle that excludes one or more the saturated data signals; and compare the calculated spectral unmixing matrix with the calculated adjusted spectral unmixing matrix. In certain embodiments, the memory includes instructions for calculating a spectral unmixing matrix where one or more rows of the matrix are removed to exclude data signals from saturated input detector channels. In other embodiments, the memory includes instructions for identifying the detector channels that are saturated and adjusting the spectral unmixing matrix to compensate for the saturated signal. In one example, the spectral unmixing matrix solution is adjusted to use an estimate of the true value of the saturated signal. In these embodiments, the estimated true value of the saturated signal is first determined and is inputted into the spectral unmixing matrix to generate an adjusted spectral unmixing matrix solution.

The memory may include instructions stored thereon, which when executed by the processor, cause the processor to classify the particle based on the one or more determined parameters of the particle. In some embodiments, systems are configured to classify a particle by assigning the particle to a particle population cluster. In other embodiments, systems are configured to classify a particle by plotting one or more parameters of the particle onto a scatter plot.

In some embodiments, the memory includes instructions for implementing a bitmap gating strategy for classifying particles. In some instances, the bitmap gating strategy implemented by the subject systems includes instructions for identifying and removing saturated data signals. In other instances, the bitmap gating strategy implemented by the subject systems includes instructions for identifying a saturated data signal and estimating the true value of the data signals that are saturated. In some embodiments, the memory includes instructions which when executed by the processor cause the processor to generate a two-dimensional bitmap having a region of interest (ROI) and determine whether a particle should be assigned to the ROI of the bitmap. In other embodiments, the memory includes instructions which when executed by the processor cause the processor to determine whether one or more bits of the ROI of the bitmap include a saturated data signal. In some instances, the memory includes instructions for determining whether one or more bits of a particle-assigned ROI of the bitmap includes a saturated data signal includes applying the saturated signal index to a second two-dimensional bitmap to generate a saturated signal bitmap; comparing the generated saturated signal bitmap with the particle-assigned ROI; and determining that one or more bits of the particle-assigned ROI are saturated. In certain instances, the processor operates using Boolean logic to compare the saturated signal bitmap with the particle-assigned ROI. For example, the saturated signal bitmap may be ANDed with the particle-assigned ROI to determine whether the one or more bits of the particle-assigned ROI are saturated.

In some embodiments, systems of interest may include one or more sort decision modules configured to generate a sorting decision for the particle based on the classification of the particle. In certain embodiments, systems further include a particle sorter (e.g., having a droplet deflector) for sorting the particles from the flow stream based on the sort decision generated by the sort decision module. The term "sorting" is used herein in its conventional sense to refer to separating components (e.g., cells, non-cellular particles such as biological macromolecules) of the sample and in some instances delivering the separated components to one or more sample collection containers. For example, the subject systems may be configured for sorting samples having 2 or more components, such as 3 or more components, such as 4 or more components, such as 5 or more components, such as 10 or more components, such as 15 or more components and including soring a sample having 25 or more components. One or more of the sample components may be separated from the sample and delivered to a sample collection container, such as 2 or more sample components, such as 3 or more sample components, such as 4 or more sample components, such as 5 or more sample components, such as 10 or more sample components and including 15 or more sample components may be separated from the sample and delivered to a sample collection container.

In some embodiments, particle sorting systems of interest are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g, cells) of the sample are sorted using a sort decision module having a plurality of sort decision units, such as those described in U.S. Provisional Patent Application No. 62/803,264, filed on Feb. 8, 2019, the disclosure of which is incorporated herein by reference. In some embodiments, methods for sorting components of sample include sorting particles (e.g., cells in a biological sample) with a particle sorting module having deflector plates, such as described in U.S. Patent Publication No. 2017/0299493, filed on Mar. 28, 2017, the disclosure of which is incorporated herein by reference.

FIG. 1 shows a functional block diagram for one example of a sorting control system, such as an analytics controller 100, for analyzing and displaying biological events. An analytics controller 100 can be configured to implement a variety of processes for controlling graphic display of biological events.

A particle analyzer or sorting system 102 can be configured to acquire biological event data. For example, a flow cytometer can generate flow cytometric event data. The particle analyzer 102 can be configured to provide biological event data to the analytics controller 100. A data communication channel can be included between the particle analyzer 102 and the analytics controller 100. The biological event data can be provided to the analytics controller 100 via the data communication channel.

The analytics controller 100 can be configured to receive biological event data from the particle analyzer 102. The biological event data received from the particle analyzer 102 can include flow cytometric event data. The analytics controller 100 can be configured to provide a graphical display including a first plot of biological event data to a display device 106. The analytics controller 100 can be further configured to render a region of interest as a gate around a population of biological event data shown by the display device 106, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 100 can be further configured to display the biological event data on the display device 106 within the gate differently from other events in the biological event data outside of the gate. For example, the analytics controller 100 can be configured to render the color of biological event data contained within the gate to be distinct from the color of biological event data outside of the gate. The display device 106 can be implemented as a monitor, a tablet computer, a smartphone, or other electronic device configured to present graphical interfaces.

The analytics controller 100 can be configured to receive a gate selection signal identifying the gate from a first input device. For example, the first input device can be implemented as a mouse 110. The mouse 110 can initiate a gate selection signal to the analytics controller 100 identifying the gate to be displayed on or manipulated via the display device 106 (e.g., by clicking on or in the desired gate when the cursor is positioned there). In some implementations, the first device can be implemented as the keyboard 108 or other means for providing an input signal to the analytics controller 100 such as a touchscreen, a stylus, an optical detector, or a voice recognition system. Some input devices can include multiple inputting functions. In such implementations, the inputting functions can each be considered an input device. For example, as shown in FIG. 1, the mouse 110 can include a right mouse button and a left mouse button, each of which can generate a triggering event.

The triggering event can cause the analytics controller 100 to alter the manner in which the data is displayed, which portions of the data is actually displayed on the display device 106, and/or provide input to further processing such as selection of a population of interest for particle sorting.

In some embodiments, the analytics controller 100 can be configured to detect when gate selection is initiated by the mouse 110. The analytics controller 100 can be further configured to automatically modify plot visualization to facilitate the gating process. The modification can be based on the specific distribution of biological event data received by the analytics controller 100.

The analytics controller 100 can be connected to a storage device 104. The storage device 104 can be configured to receive and store biological event data from the analytics controller 100. The storage device 104 can also be configured to receive and store flow cytometric event data from the analytics controller 100. The storage device 104 can be further configured to allow retrieval of biological event data, such as flow cytometric event data, by the analytics controller 100.

A display device 106 can be configured to receive display data from the analytics controller 100. The display data can comprise plots of biological event data and gates outlining sections of the plots. The display device 106 can be further configured to alter the information presented according to input received from the analytics controller 100 in conjunction with input from the particle analyzer 102, the storage device 104, the keyboard 108, and/or the mouse 110.

In some implementations the analytics controller 100 can generate a user interface to receive example events for sorting. For example, the user interface can include a control for receiving example events or example images. The example events or images or an example gate can be provided prior to collection of event data for a sample, or based on an initial set of events for a portion of the sample.

Figure 2A:
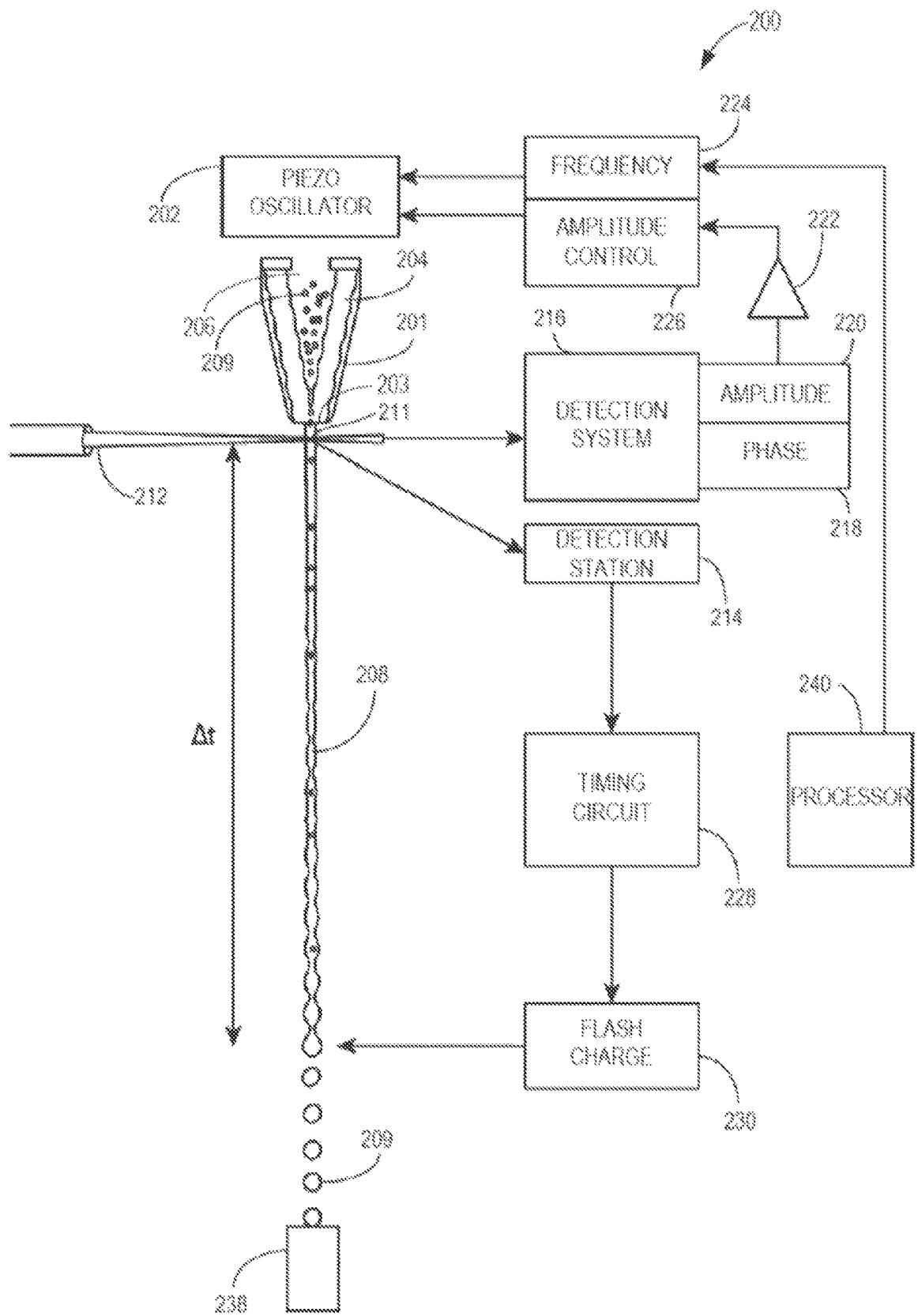
FIG. 2A depicts a schematic drawing of a particle sorter system according to certain embodiments.

FIG. 2A is a schematic drawing of a particle sorter system 200 (e.g., the particle analyzer 102) in accordance with one embodiment presented herein. In some embodiments, the particle sorter system 200 is a cell sorter system. As shown in FIG. 2A, a drop formation transducer 202 (e.g., piezo-oscillator) is coupled to a fluid conduit 201, which can be coupled to, can include, or can be, a nozzle 203. Within the fluid conduit 201, sheath fluid 204 hydrodynamically focuses a sample fluid 206 comprising particles 209 into a moving fluid column 208 (e.g. a stream). Within the moving fluid column 208, particles 209 (e.g., cells) are lined up in single file to cross a monitored area 211 (e.g., where laser-stream intersect), irradiated by an irradiation source 212 (e.g., a laser). Vibration of the drop formation transducer 202 causes moving fluid column 208 to break into a plurality of drops 210, some of which contain particles 209.

In operation, a detection station 214 (e.g., an event detector) identifies when a particle of interest (or cell of interest) crosses the monitored area 211. Detection station 214 feeds into a timing circuit 228, which in turn feeds into a flash charge circuit 230. At a drop break off point, informed by a timed drop delay (Δt), a flash charge can be applied to the moving fluid column 208 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 2A, the drops can be collected in a drain receptacle 238.

A detection system 216 (e.g. a drop boundary detector) serves to automatically determine the phase of a drop drive signal when a particle of interest passes the monitored area 211. An exemplary drop boundary detector is described in U.S. Pat. No. 7,679,039, which is incorporated herein by reference in its entirety. The detection system 216 allows the instrument to accurately calculate the place of each detected particle in a drop. The detection system 216 can feed into an amplitude signal 220 and/or phase 218 signal, which in turn feeds (via amplifier 222) into an amplitude control circuit 226 and/or frequency control circuit 224. The amplitude control circuit 226 and/or frequency control circuit 224, in turn, controls the drop formation transducer 202. The amplitude control circuit 226 and/or frequency control circuit 224 can be included in a control system.

In some implementations, sort electronics (e.g., the detection system 216, the detection station 214 and a processor 240) can be coupled with a memory configured to store the detected events and a sort decision based thereon. The sort decision can be included in the event data for a particle. In some implementations, the detection system 216 and the detection station 214 can be implemented as a single detection unit or communicatively coupled such that an event measurement can be collected by one of the detection system 216 or the detection station 214 and provided to the non-collecting element.

Figure 2B:
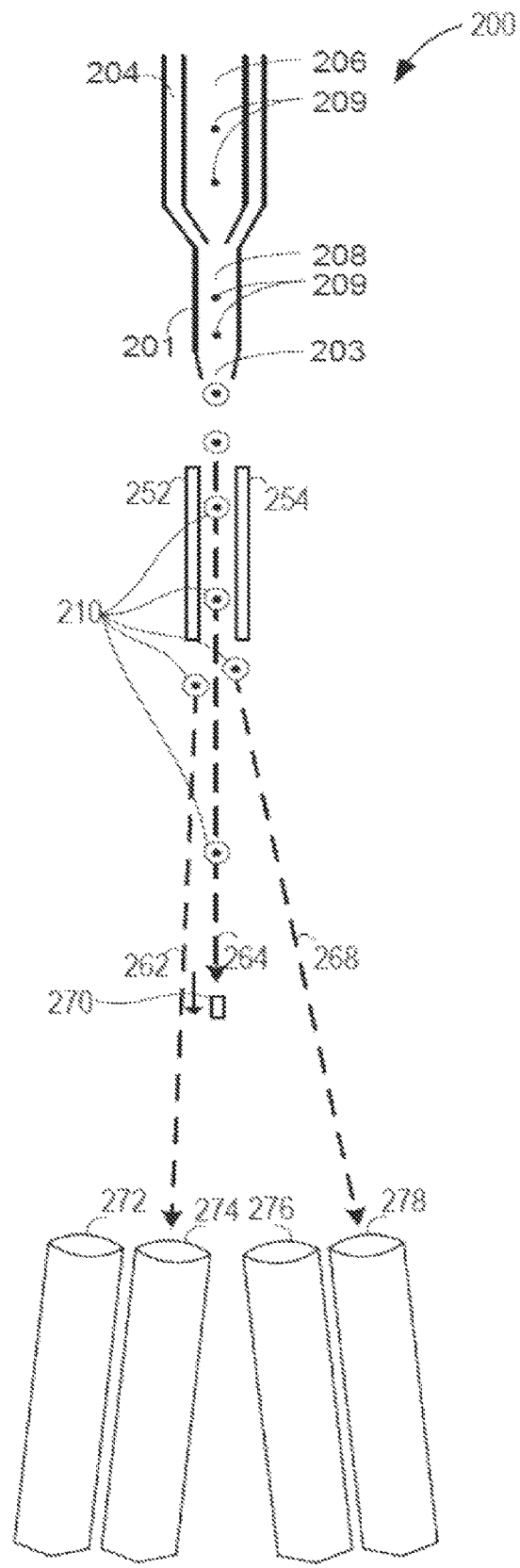
FIG. 2B depicts a schematic drawing of a particle sorter system according to certain embodiments.

FIG. 2B is a schematic drawing of a particle sorter system, in accordance with one embodiment presented herein. The particle sorter system 200 shown in FIG. 2B, includes deflection plates 252 and 254. A charge can be applied via a stream-charging wire in a barb. This creates a stream of droplets 210 containing particles 210 for analysis. The particles can be illuminated with one or more light sources (e.g., lasers) to generate light scatter and fluorescence information. The information for a particle is analyzed such as by sorting electronics or other detection system (not shown in FIG. 2B). The deflection plates 252 and 254 can be independently controlled to attract or repel the charged droplet to guide the droplet toward a destination collection receptacle (e.g., one of 272, 274, 276, or 278). As shown in FIG. 2B, the deflection plates 252 and 254 can be controlled to direct a particle along a first path 262 toward the receptacle 274 or along a second path 268 toward the receptacle 278. If the particle is not of interest (e.g., does not exhibit scatter or illumination information within a specified sort range), deflection plates may allow the particle to continue along a flow path 264. Such uncharged droplets may pass into a waste receptacle such as via aspirator 270.

The sorting electronics can be included to initiate collection of measurements, receive fluorescence signals for particles, and determine how to adjust the deflection plates to cause sorting of the particles. Example implementations of the embodiment shown in FIG. 2B include the BD FACSAria™ line of flow cytometers commercially provided by Becton, Dickinson and Company (Franklin Lakes, NJ).

In some embodiments, one or more components described for the particle sorter system 200 can be used to analyze and characterize particles, with or without physically sorting the particles into collection vessels. Likewise, one or more components described below for the particle analysis system 300 (FIG. 3) can be used to analyze and characterize particles, with or without physically sorting the particles into collection vessels. For example, particles can be grouped or displayed in a tree that includes at least three groups as described herein, using one or more of the components of the particle sorter system 200 or particle analysis system 300.

Figure 3:
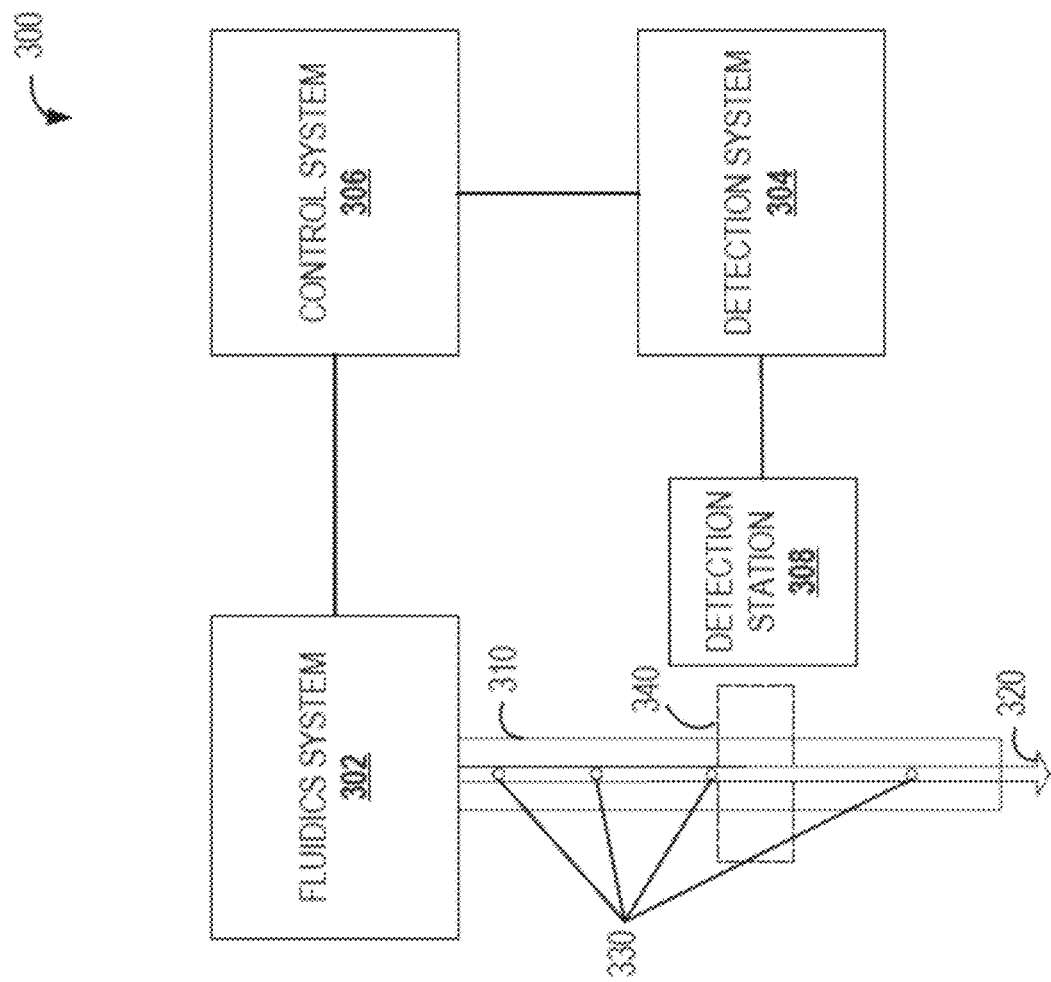
FIG. 3 depicts a functional block diagram of a particle analysis system for computational based sample analysis and particle characterization according to certain embodiments.

FIG. 3 shows a functional block diagram of a particle analysis system for computational based sample analysis and particle characterization. In some embodiments, the particle analysis system 300 is a flow system. The particle analysis system 300 shown in FIG. 3 can be configured to perform, in whole or in part, the methods described herein such as. The particle analysis system 300 includes a fluidics system 302. The fluidics system 302 can include or be coupled with a sample tube 310 and a moving fluid column within the sample tube in which particles 330 (e.g. cells) of a sample move along a common sample path 320.

The particle analysis system 300 includes a detection system 304 configured to collect a signal from each particle as it passes one or more detection stations along the common sample path. A detection station 308 generally refers to a monitored area 340 of the common sample path. Detection can, in some implementations, include detecting light or one or more other properties of the particles 330 as they pass through a monitored area 340. In FIG. 3, one detection station 308 with one monitored area 340 is shown. Some implementations of the particle analysis system 300 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 304 is configured to collect a succession of such data points in a first time interval.

The particle analysis system 300 can also include a control system 306. The control system 306 can include one or more processors, an amplitude control circuit 226 and/or a frequency control circuit 224 as shown in FIG. 2B. The control system 206 shown can be operationally associated with the fluidics system 302. The control system 206 can be configured to generate a calculated signal frequency for at least a portion of the first time interval based on a Poisson distribution and the number of data points collected by the detection system 304 during the first time interval. The control system 306 can be further configured to generate an experimental signal frequency based on the number of data points in the portion of the first time interval. The control system 306 can additionally compare the experimental signal frequency with that of a calculated signal frequency or a predetermined signal frequency.

Figure 4:
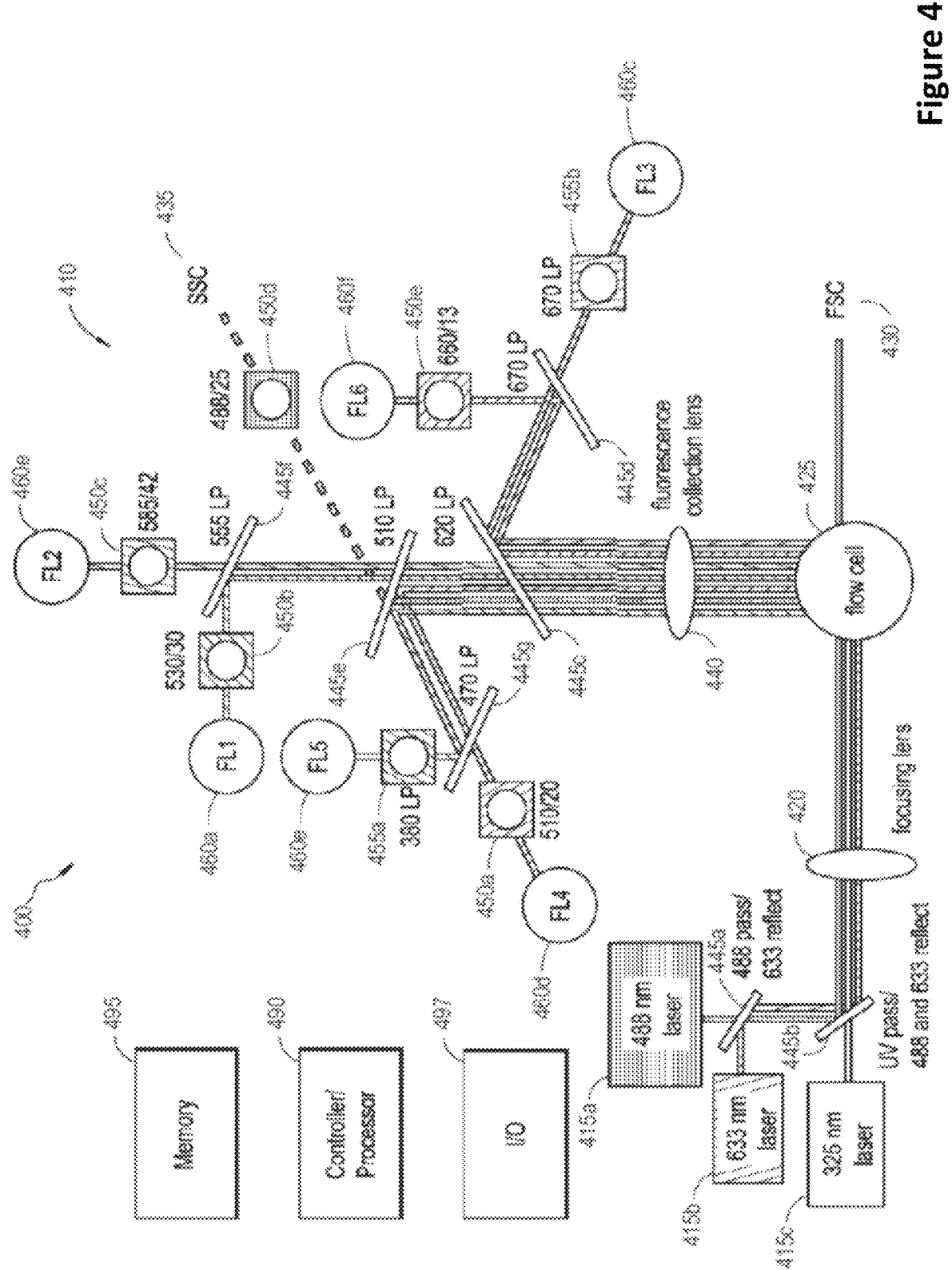
FIG. 4 depicts a flow cytometer according to certain embodiments.

FIG. 4 shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 115a-c emit light in the form of a laser beam. The wavelengths of the laser beams emitted from excitation lasers 415a-415c are 488 nm, 633 nm, and 325 nm, respectively, in the example system of FIG. 4. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445g is a 620 SP beam splitter, meaning that the beam splitter 445g transmits wavelengths of light that are 620 nm or shorter and reflects wavelengths of light that are longer than 620 nm in a different direction. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4 includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Systems according to some embodiments, may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low-level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, the processor includes analog electronics which provide feedback control, such as for example negative feedback control.

The system memory may be any of a variety of known or future memory storage devices. Examples include any commonly available random-access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra-Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows 10, Windows NT®, Windows XP, Windows 7, Windows 8, iOS, Sun Solaris, Linux, OS/400, Compaq Tru64 Unix, SGI IRIX, Siemens Reliant Unix, Ubuntu, Zorin OS and others.

Figure 8:
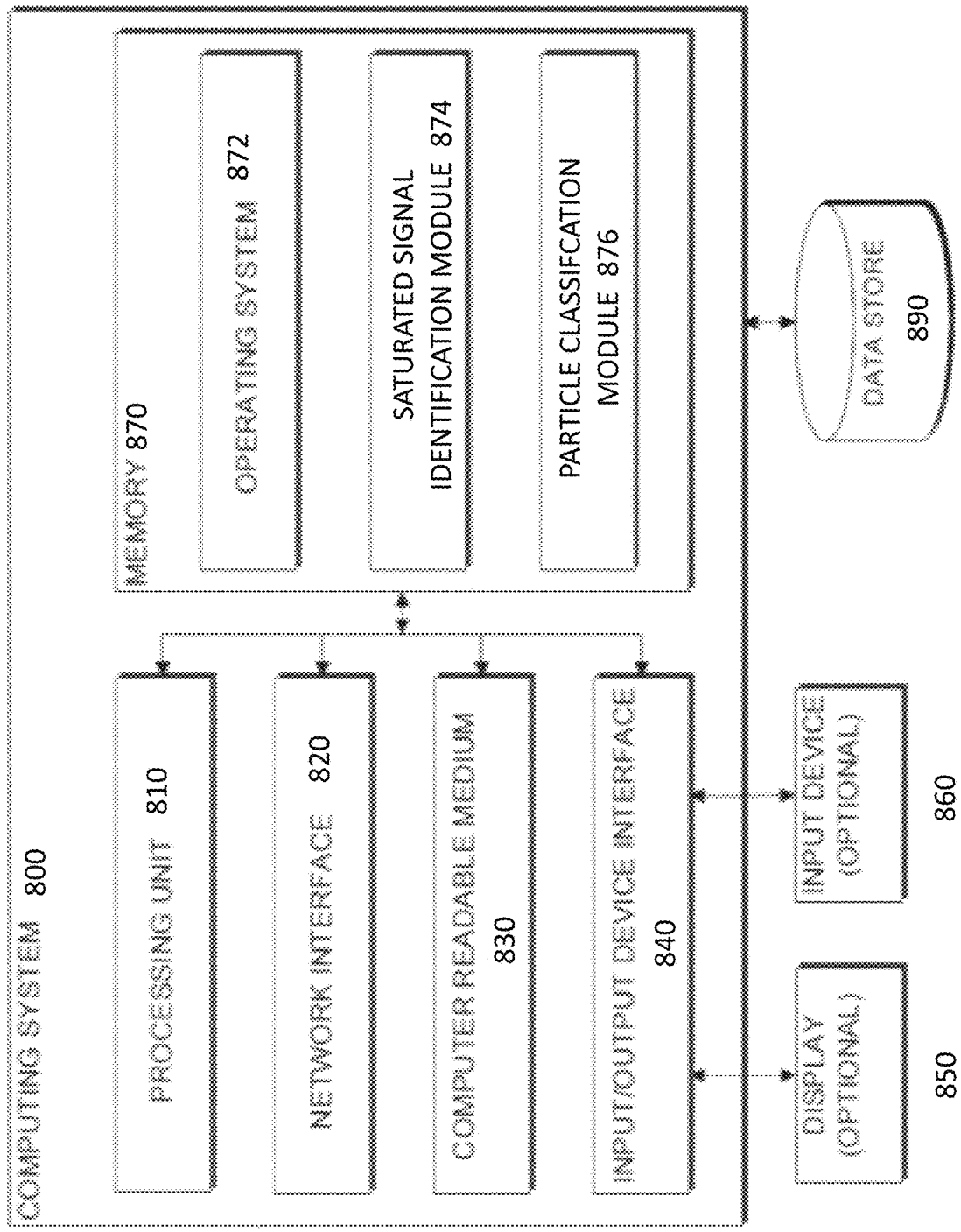
FIG. 8 depicts a block diagram of a computing system according to certain embodiments.

FIG. 8 depicts a general architecture of an example computing device 800 according to certain embodiments. The general architecture of the computing device 800 depicted in FIG. 800 includes an arrangement of computer hardware and software components. The computing device 800 may include many more (or fewer) elements than those shown in FIG. 8. It is not necessary, however, that all of these generally conventional elements be shown in order to provide an enabling disclosure. As illustrated, the computing device 800 includes a processing unit 810, a network interface 820, a computer readable medium drive 830, an input/output device interface 840, a display 850, and an input device 860, all of which may communicate with one another by way of a communication bus. The network interface 820 may provide connectivity to one or more networks or computing systems. The processing unit 810 may thus receive information and instructions from other computing systems or services via a network. The processing unit 810 may also communicate to and from memory 870 and further provide output information for an optional display 850 via the input/output device interface 840. The input/output device interface 840 may also accept input from the optional input device 860, such as a keyboard, mouse, digital pen, microphone, touch screen, gesture recognition system, voice recognition system, gamepad, accelerometer, gyroscope, or other input device.

The memory 870 may contain computer program instructions (grouped as modules or components in some embodiments) that the processing unit 810 executes in order to implement one or more embodiments. The memory 870 generally includes RAM, ROM and/or other persistent, auxiliary or non-transitory computer-readable media. The memory 870 may store an operating system 872 that provides computer program instructions for use by the processing unit 810 in the general administration and operation of the computing device 800. The memory 870 may further include computer program instructions and other information for implementing aspects of the present disclosure.

For example, in one embodiment, the memory 870 includes a saturated data signal identification module 874 for generating a saturated signal index and a particle classification module 876 for adjusting one or more parameters of the particle classification, such as parameters of a sorting decision.

In certain embodiments, the subject systems are flow cytometric systems employing the above described algorithm for analyzing and adjusting a particle classification index in response to one or more saturated data signals from light detected from particles in a flow stream. Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem.* January; 49(pt 1):17-28; Linden, et. al., *Semin Throm Hemost.* 2004 October; 30(5):502-11; Alison, et al. *J Pathol*, 2010 December; 222(4):335-344; and Herbig, et al. (2007) *Crit Rev Ther Drug Carrier Syst.* 24(3): 203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject particle sorting systems are flow cytometric systems, such those described in U.S. Pat. Nos. 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

Integrated Circuit Devices

Aspects of the present disclosure also include integrated circuit devices programmed to adjust a particle classification index in response to one or more saturated data signals from light detected from particles in a flow stream are also provided. In embodiments, the integrated circuit device may be a field programmable gated array (FPGA), an application specific integrated circuit (ASIC) or a complex programmable logic device (CPLD), or some other integrated circuit device. In some embodiments, the integrated circuit device is programmed to identify one or more saturated data signals from light detected from particles in a flow stream; generate a saturated signal index comprising the identified saturated data signals; and apply the saturated signal index to a particle classification index to generate an adjusted particle classification index.

In some embodiments, the saturated signal index used by the integrated circuit is a binary word which identifies which detector channels of a light detection system that have saturated an analog-digital converter. In some instances, the saturation signal index is a binary word composed of 1 bit or more, such as 2 bits or more, such as 4 bits or more, such as 8 bits or more, such as 16 bits or more, such as 32 bits or more, such as 64 bits or more, such as 128 bits or more and including 256 bits or more. For example, the saturation signal index may be a 4-bit binary word, an 8-bit binary word, a 16-bit binary word, a 32-bit binary word, a 64-bit binary word, a 128-bit binary word or a 256-bit binary word. In certain instances, the saturation signal index is a combination of two or more binary words, such as 3 or more, such as 4 or more, such as 5 or more, such as 6 or more, such as 7 or more, such as 8 or more, such as 9 or more and including 10 or more binary words. Where the saturation signal index is a combination of binary words, each binary word may independently be a binary word composed of 1 bit or more, such as 2 bits or more, such as 4 bits or more, such as 8 bits or more, such as 16 bits or more, such as 32 bits or more, such as 64 bits or more, such as 128 bits or more and including 256 bits or more. In some embodiments, each binary word in the saturation signal index may independently be a 4-bit binary word, an 8-bit binary word, a 16-bit binary word, a 32-bit binary word, a 64-bit binary word, a 128-bit binary word or a 256-bit binary word.

In embodiments, the integrated circuit is programmed to determine one or more parameters of a particle from generated data signals for the light detection system. In some embodiments, the integrated circuit is programmed to calculate a spectral unmixing matrix for fluorescence of the particle. In some embodiments, the integrated circuit is programmed to calculate a spectral unmixing matrix using a weighted least squares algorithm. In some instances, the weighted least squares algorithm is calculated according to:

$$\hat{a} = (X^T W X)^{-1} X^T W y$$

where y is measured detector values from the plurality of photodetectors of the light detection system for each cell; â is estimated fluorophore abundance X is spillover; and W is $$\begin{bmatrix} W_{ii} & 0 & \cdots & 0 \\ 0 & W_{i+1,i+1} & \cdots & 0 \\ \vdots & \vdots & \ddots & \vdots \\ 0 & 0 & \cdots & W_{i+n,i+n} \end{bmatrix}$$

In some embodiments, each $W_{ii}$ is calculated according to:

$$W_{ii} = \frac{1}{\sigma_i^2} \approx \frac{1}{y_i + \lambda_i}$$

where $\sigma_i^2$ is variance at detector i; $y_i$ is signal at detector i; and $\lambda_i$ is constant noise at detector i. In certain embodiments, the spectral unmixing matrix is calculated according to: $(X^T W X)^{-1} X^T W$. In some instances, the method comprises inverting $(X^T W X)$ for each cell detected by the light detection system detection system to calculate a spectral unmixing matrix. In some embodiments, the integrated circuit is programmed to calculate a solution to the spectral unmixing matrix using one or more of an iterative Newton-Raphson calculation, a Sherman-Morrison iterative inverse updater, by matrix decomposition (e.g., an LU matrix decomposition, a Gaussian elimination, a modified Cholesky decomposition) or singular value decomposition (SVD). In certain embodiments, integrated circuits programmed to calculate a solution to the spectral unmixing matrix include those described in U.S. patent application Ser. No. 16/725,799 filed on Dec. 23, 2019, the disclosure of which is herein incorporated by reference.

In some instances, the integrated circuit is programmed to calculate an adjusted spectral unmixing matrix using the calculated saturated signal index, such as where one or more saturated data signals are excluded. In other instances, the integrated circuit is programmed to calculate an adjusted spectral unmixing matrix where data signals from the detector channels that are saturated are excluded. In certain instances, the integrated circuit is programmed to calculate a spectral unmixing matrix for the fluorescence of the particle; calculate an adjusted spectral unmixing matrix for the fluorescence of the particle that excludes one or more the saturated data signals; and compare the calculated spectral unmixing matrix with the calculated adjusted spectral unmixing matrix. In certain embodiments, the integrated circuit is programmed to calculate a spectral unmixing matrix where one or more rows of the matrix are removed to exclude data signals from saturated input detector channels. In other embodiments, the integrated circuit is programmed to identify the detector channels that are saturated and adjust the spectral unmixing matrix to compensate for the saturated signal. In one example, the spectral unmixing matrix solution is adjusted to use an estimate of the true value of the saturated signal. In these embodiments, the estimated true value of the saturated signal is first determined and is inputted into the spectral unmixing matrix to generate an adjusted spectral unmixing matrix solution.

The integrated circuit is programmed to classify the particle based on the one or more determined parameters of the particle. In some embodiments, the integrated circuit is programmed to classify a particle by assigning the particle to a particle population cluster. In other embodiments, the integrated circuit is programmed to classify a particle by plotting one or more parameters of the particle onto a scatter plot.

In some embodiments, the integrated circuit is programmed to implement a bitmap gating strategy to classify the particles. In some instances, the bitmap gating strategy implemented by the integrated circuit includes identifying and removing saturated data signals. In other instances, the bitmap gating strategy implemented by the integrated circuit includes instructions for identifying a saturated data signal and estimating the true value of the data signals that are saturated. In some embodiments, the integrated circuit are programmed to generate a two-dimensional bitmap having a region of interest (ROI) and determine whether a particle should be assigned to the ROI of the bitmap. In other embodiments, the integrated circuit is programmed to determine whether one or more bits of the ROI of the bitmap include a saturated data signal. In some instances, the integrated circuit is programmed to apply the saturated signal index to a second two-dimensional bitmap to generate a saturated signal bitmap; compare the generated saturated signal bitmap with the particle-assigned ROI; and determine that one or more bits of the particle-assigned ROI are saturated. In certain instances, the integrated circuit is programmed to use Boolean logic to compare the saturated signal bitmap with the particle-assigned ROI. For example, the integrated circuit may be programmed to ANDed the saturated signal bitmap with the particle-assigned ROI to determine whether the one or more bits of the particle-assigned ROI are saturated.

Computer-Readable Storage Medium for Adjusting a Particle Classification Index in Response to Saturated Data Signals Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, CA), Visual Basic (Microsoft Corp., Redmond, WA), and C++ (AT&T Corp., Bedminster, NJ), as well as any many others.

In some embodiments, computer readable storage media of interest include a computer program stored thereon, where the computer program when loaded on the computer includes instructions having: algorithm for detecting light from particles in a flow stream; algorithm for identifying one or more saturated data signals; algorithm for generating a saturated signal index that corresponds to the identified saturated data signals and algorithm for applying the saturated signal index to a particle classification index to generate an adjusted particle classification index.

The computer readable storage medium may include instructions for capturing one or more images of the flow stream, such as 2 or more images of the flow stream, such as 3 or more images, such as 4 or more images, such as 5 or more images, such as 10 or more images, such as 15 or more images and including 25 or more images. In certain embodiments, the computer readable storage medium includes instructions for optical adjustment of the captured images, such as to enhance the optical resolution of the image. In certain embodiments, computer readable storage medium may include instructions for enhancing the resolution of the captured images by 5% or greater, such as by 10% or greater, such as by 25% or greater, such as by 50% or greater and including enhancing the resolution of the captured images by 75% or greater.

In embodiments, computer readable storage media of interest include algorithm for classifying particles in the sample based on one or more of the determined parameters of the particle. In certain embodiments, the computer readable storage media includes algorithm for classifying particles in the sample includes using a bitmap gating strategy where classifying particles includes identifying and in some instances, removing the saturated data signals from the particle classification parameters. In other embodiments, computer readable storage media includes algorithm for classifying particles in the sample includes identifying saturated data signals and estimating the true value of the data signals that are saturated.

The computer readable storage medium also includes algorithm for generating a two-dimensional bitmap having a region of interest (ROI) and algorithm for determining whether a particle should be assigned to the ROI of the bitmap. In some embodiments, computer readable storage media of interest include algorithm for determining whether one or more bits of the ROI of the bitmap include a saturated data signal. In other embodiments, computer readable storage media of interest include algorithm for applying the saturated signal index to a second two-dimensional bitmap to generate a saturated signal bitmap, algorithm for comparing the generated saturated signal bitmap with the particle-assigned ROI and algorithm for determining that one or more bits of the particle-assigned ROI are saturated.

The non-transitory computer readable storage medium may also include algorithm for calculating one or more parameters of the particle. In these embodiments, the computer readable storage medium includes algorithm for calculating a spectral unmixing matrix for the fluorescence of the particle, algorithm for calculating an adjusted spectral unmixing matrix for the fluorescence of the particle that excludes one or more the saturated data signals and algorithm for comparing the calculated spectral unmixing matrix with the calculated adjusted spectral unmixing matrix.

The computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Kits

Aspects of the present disclosure further include kits, where kits include one or more of the integrated circuits described herein. In some embodiments, kits may further include programming for the subject systems, such as in the form of a computer readable medium (e.g., flash drive, USB storage, compact disk, DVD, Blu-ray disk, etc.) or instructions for downloading the programming from an internet web protocol or cloud server. Kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject systems, methods and computer systems find use in a variety of applications where it is desirable to analyze and sort particle components in a sample in a fluid medium, such as a biological sample. In some embodiments, the systems and methods described herein find use in flow cytometry characterization of biological samples labelled with fluorescent tags. In other embodiments, the systems and methods find use in spectroscopy of emitted light. In addition, the subject systems and methods find use in increasing the obtainable signal from light collected from a sample (e.g., in a flow stream). In certain instances, the present disclosure finds use in enhancing measurement of light collected from a sample that is irradiated in a flow stream in a flow cytometer. Embodiments of the present disclosure find use where it is desirable to provide a flow cytometer with improved cell sorting accuracy, enhanced particle collection, particle charging efficiency, more accurate particle charging and enhanced particle deflection during cell sorting.

Embodiments of the present disclosure also find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method comprising:
    irradiating the flow stream with a light source;
    irradiating the flow stream with a first beam of frequency shifted light and second beam of frequency shifted light;
    detecting light from a sample comprising particles in a flow stream;
    generating a plurality of data signals from the detected light;
    identifying one or more saturated data signals;
    generating a saturated signal index comprising the identified saturated data signals; and
    applying the saturated signal index to a particle classification index to generate an adjusted particle classification index.

2. The method according to claim 1, wherein the saturated signal index comprises a binary word that identifies one or more detector channels that are saturated.

3. The method according to claim 1, wherein the method comprises determining one or more parameters of a particle in the flow stream from the generated data signals.

4. The method according to claim 3, wherein determining one or more parameters of the particle comprises calculating a spectral unmixing matrix for the fluorescence of the particle.

5. The method according to claim 4, further comprising adjusting the spectral unmixing matrix for the fluorescence of the particle based on the saturated signal index.

6. The method according to claim 5, wherein adjusting the spectral unmixing matrix comprises excluding one or more of the saturated data signals.

7. The method according to claim 6, wherein calculating one or more parameters of the particle comprises:
    calculating a spectral unmixing matrix for the fluorescence of the particle;
    calculating an adjusted spectral unmixing matrix for the fluorescence of the particle that excludes one or more the saturated data signals; and
    comparing the calculated spectral unmixing matrix with the calculated adjusted spectral unmixing matrix.

8. The method according to claim 3, further comprising classifying the particle based on the one or more determined parameters of the particle.

9. The method according to claim 8, wherein classifying the particle comprises:
    generating a two-dimensional bitmap comprising a region of interest (ROI); and
    assigning the particle to an ROI of the two-dimensional bitmap.

10. The method according to claim 9, wherein the method further comprises determining whether one or more bits of the particle assigned ROI comprise a saturated data signal.

11. The method according to claim 10, wherein determining whether one or more bits of the particle assigned ROI comprise a saturated data signal comprises:
    applying the saturated signal index to a second two-dimensional bitmap to generate a saturated signal bitmap;
    comparing the generated saturated signal bitmap with the particle assigned ROI; and
    identifying that one or more bits of the particle assigned ROI are saturated.

12. The method according to claim 11, wherein the saturated signal bitmap is compared with the particle assigned ROI using Boolean logic.

13. The method according to claim 12, wherein the saturated signal bitmap is ANDed with the particle assigned ROI.

14. The method according to claim 1, further generating a particle sorting decision based on the adjusted particle classification index.

15. The method according to claim 1, wherein the parameters of the particle are determined from scattered light from the particle.

16. The method according to claim 1, further comprising sorting the particle.

17. The method according to claim 1, wherein parameters of the particle are calculated by an integrated circuit device.

18. The method according to claim 17, wherein the integrated circuit device is a field programmable gate array (FPGA).

* * * * *